Sept. 7, 1954

C. J. O'LEARY 2,688,415

CONVEYER

Filed Jan. 6, 1950

INVENTOR.
C. J. O'LEARY
BY [signature]
ATTORNEY

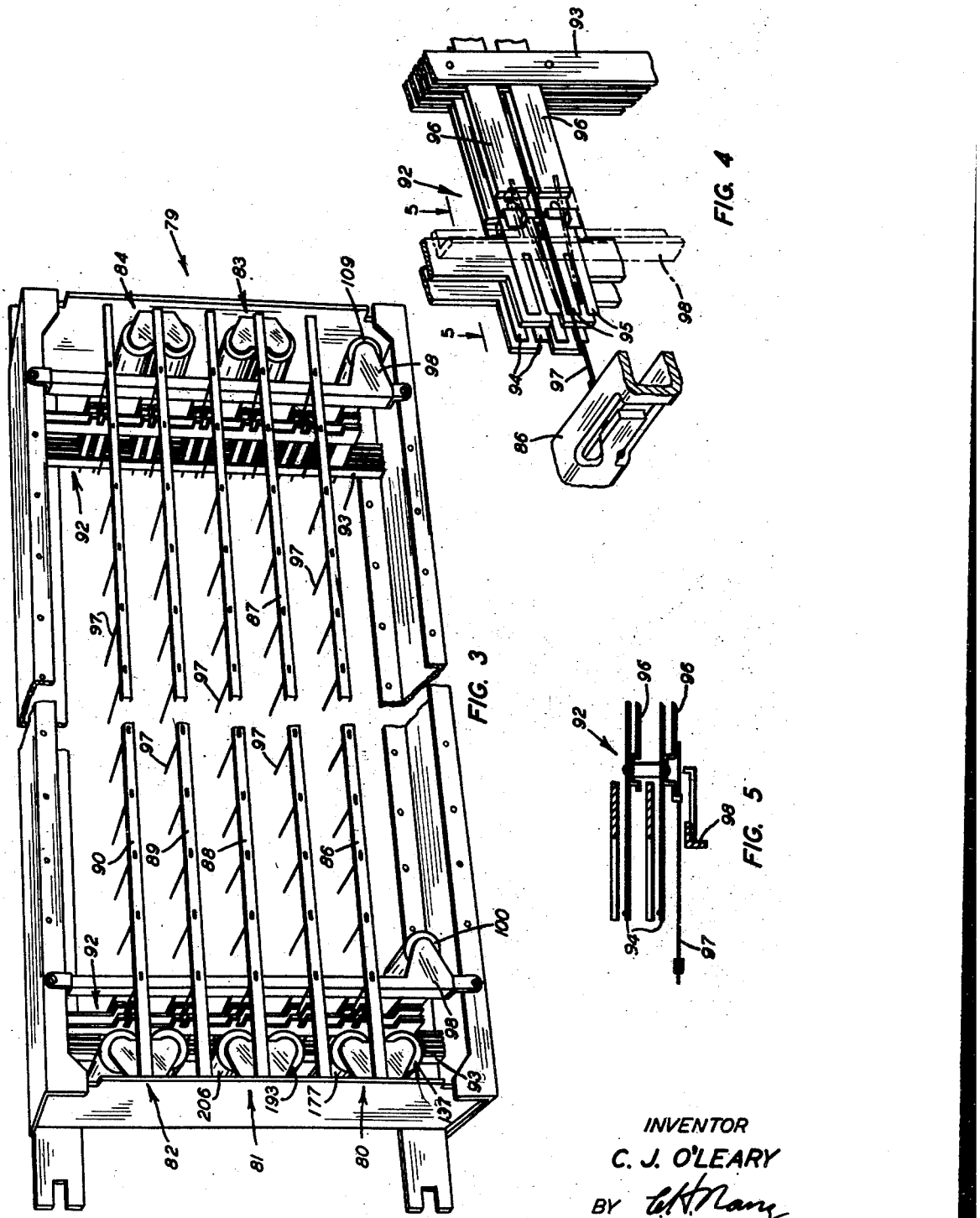

Sept. 7, 1954

C. J. O'LEARY 2,688,415

CONVEYER

Filed Jan. 6, 1950

INVENTOR
C. J. O'LEARY
BY
ATTORNEY

Sept. 7, 1954 　　　C. J. O'LEARY 　　　2,688,415
CONVEYER
Filed Jan. 6, 1950 　　　　　　　　　　8 Sheets-Sheet 6

INVENTOR
C. J. O'LEARY
BY
ATTORNEY

Sept. 7, 1954

C. J. O'LEARY 2,688,415

CONVEYER

Filed Jan. 6, 1950

INVENTOR
C. J. O'LEARY
BY
ATTORNEY

Sept. 7, 1954
C. J. O'LEARY
2,688,415
CONVEYER
Filed Jan. 6, 1950
8 Sheets-Sheet 8
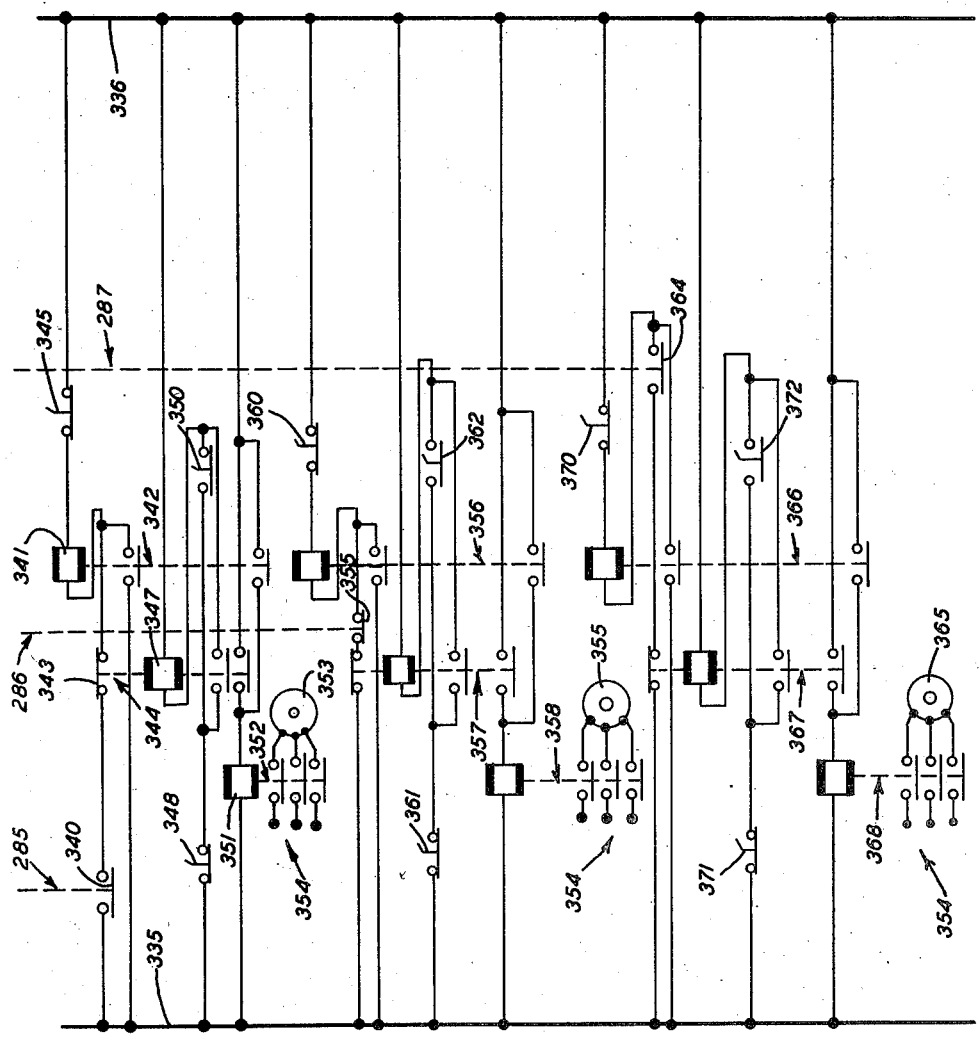
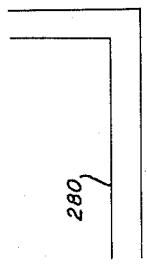
FIG. 11
INVENTOR
C. J. O'LEARY
BY
ATTORNEY Patented Sept. 7, 1954

2,688,415

UNITED STATES PATENT OFFICE 2,688,415

CONVEYER

Charles J. O'Leary, Baltimore, Md., assignor to Western Electric Company, Incorporated, New York, N. Y., a corporation of New York Application January 6, 1950, Serial No. 137,226

6 Claims. (Cl. 214—11)

1

This invention relates to conveyors, and more particularly to conveyors designed to deliver articles to a plurality of stations in a sequence determined at a point where the articles are placed on the conveyor.

An object of the invention is to provide new and improved conveyors.

Another object of the invention is to provide new and improved conveyor apparatus which delivers articles to a plurality of stations in a sequence determined at a point where the articles are placed on the apparatus.

In one apparatus illustrating certain features of the invention as applied to a conveyor for selectively transporting tubs containing a batch of ingredients to a series of mixing machines, there is provided a plurality of manually-operable contacting elements at the beginning of the conveyor, one for each mixing machine. When the contacting elements are actuated, they initiate the operation of automatic circuit connections to cause the tubs to be delivered to the mixing machines in the sequence in which the contacting elements are operated. The circuit connections set up upon the operation of the contacting elements are arranged to register the order of operation of the contacting elements and then to control various motor operating switching sections provided in the conveyor adjacent to the mixing machines in a variable sequence to cause the conveyor to deliver the tubs to the mixing machines in accordance with the sequence in which the contacting elements were operated. The circuits associated with the contacting elements are provided with means for cancelling a preselected destination for a particular tub so that it may be rerouted to any of the other destinations by subsequent operation of its respective contacting element.

A clear understanding of the invention may be had by referring to the following detailed description of a specific embodiment thereof, when read in conjunction with the appended drawings, in which:

Fig. 3 is a perspective view of a coordinate switch system;

Fig. 4 is an enlarged, fragmentary, perspective view of a portion of the coordinate switch system shown in Fig. 3;

Fig. 5 is a sectional view taken along line 5—5 of Fig. 4;

2

Figures 1, 2:
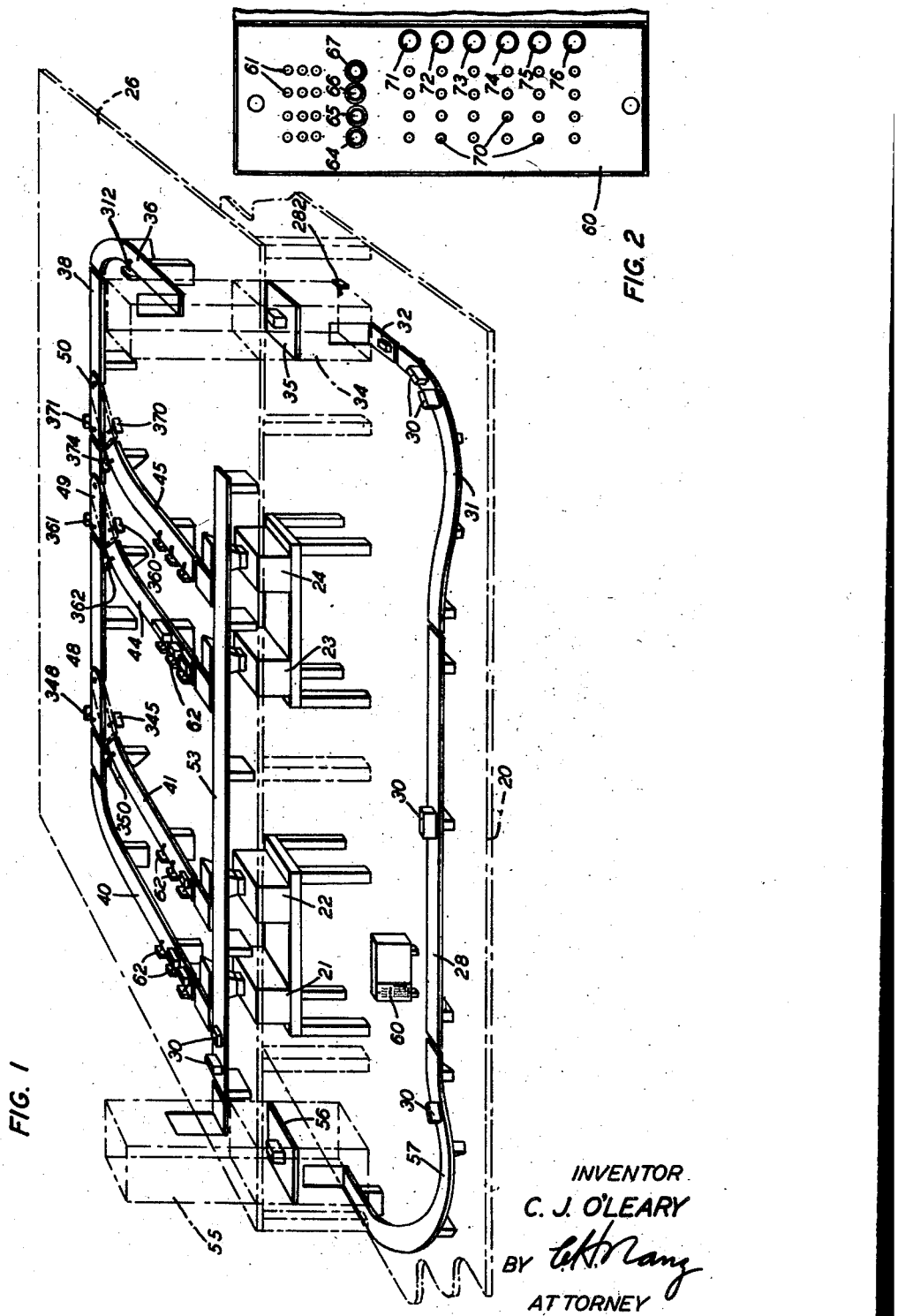
Fig. 1 is a schematic diagram of a conveyor apparatus embodying the present invention.
Fig. 2 is an enlarged view of a master control panel forming a part of the conveyor apparatus shown in Fig. 1.
Figure 6:
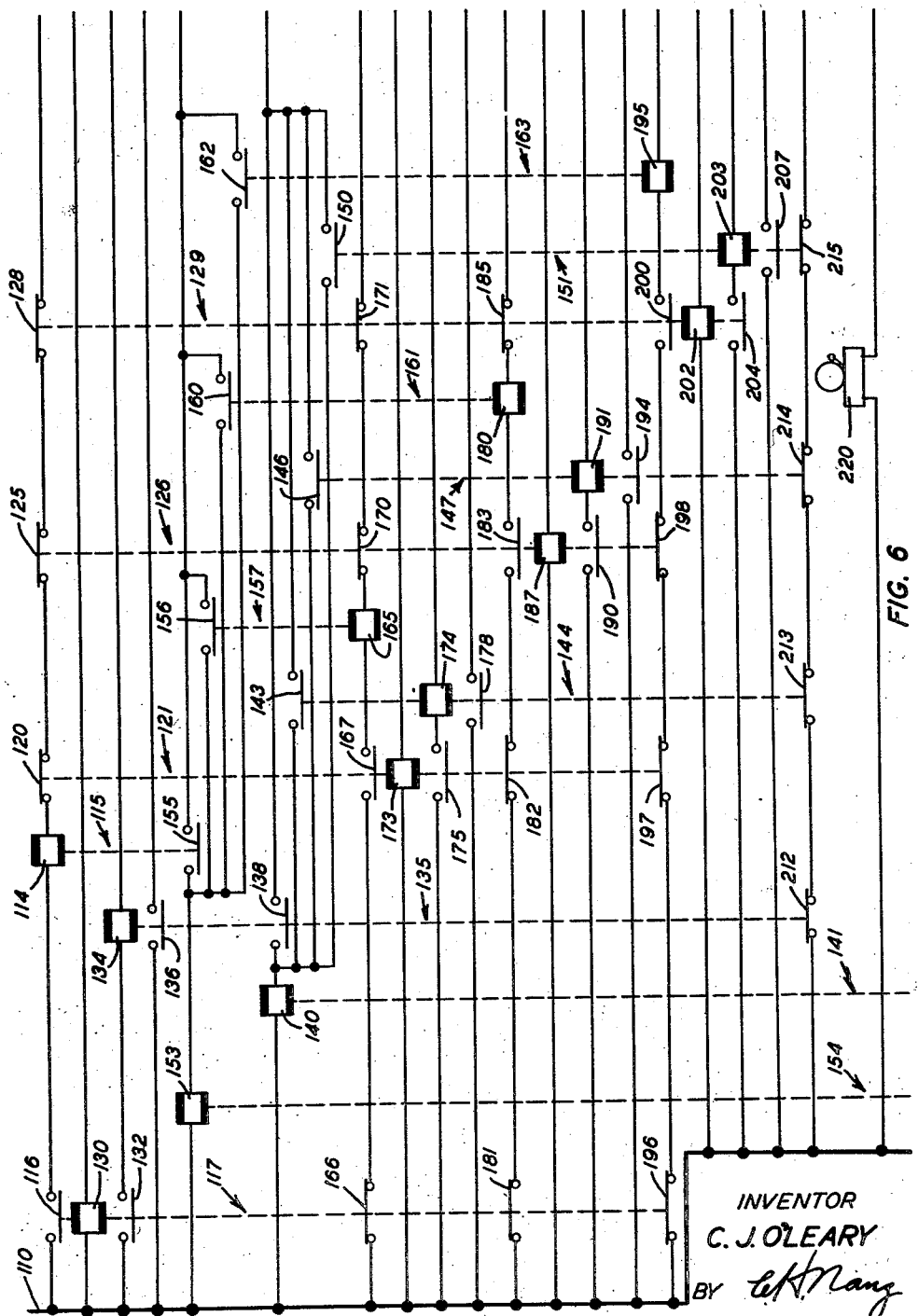
Figure 7:
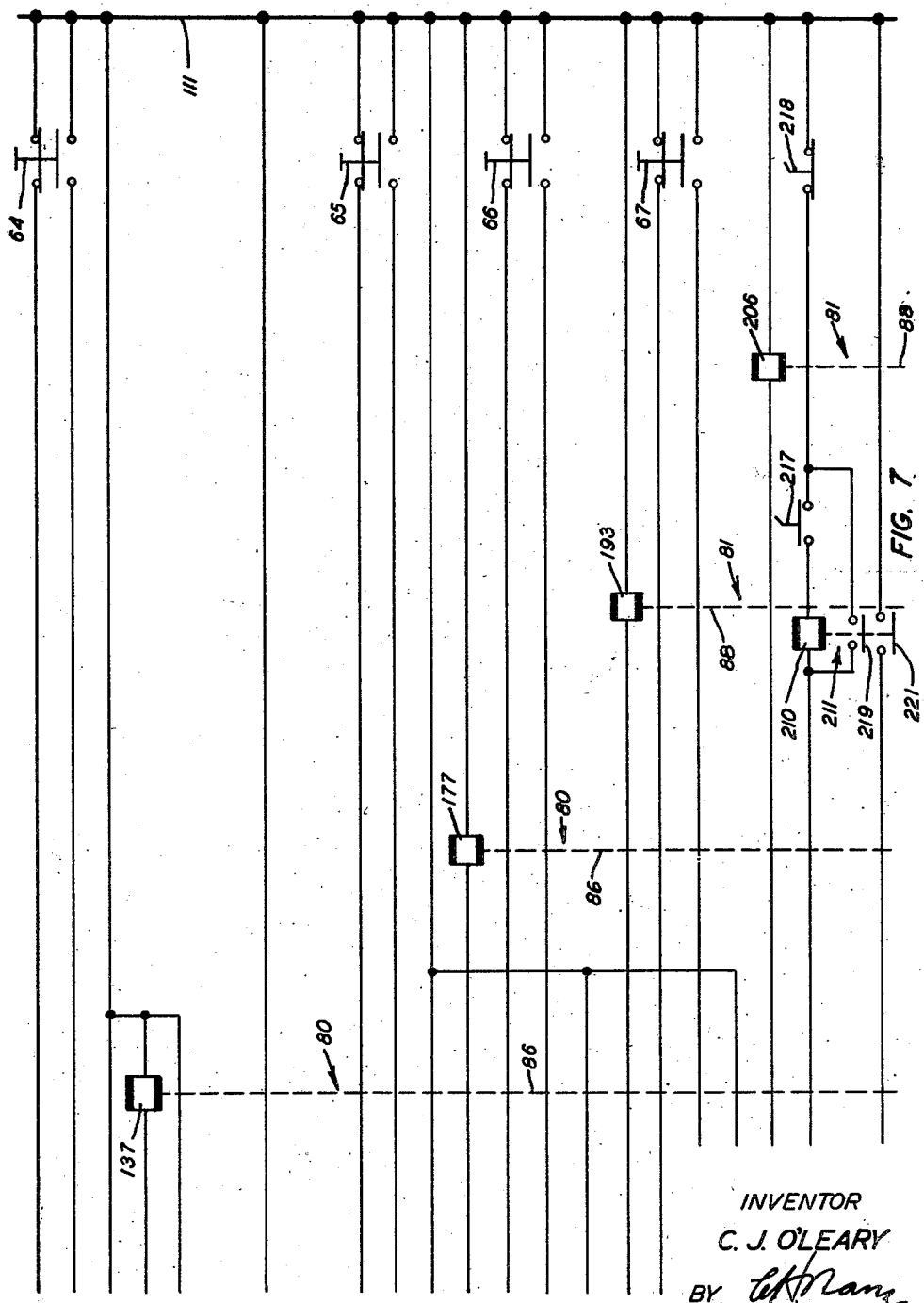
Figure 8:
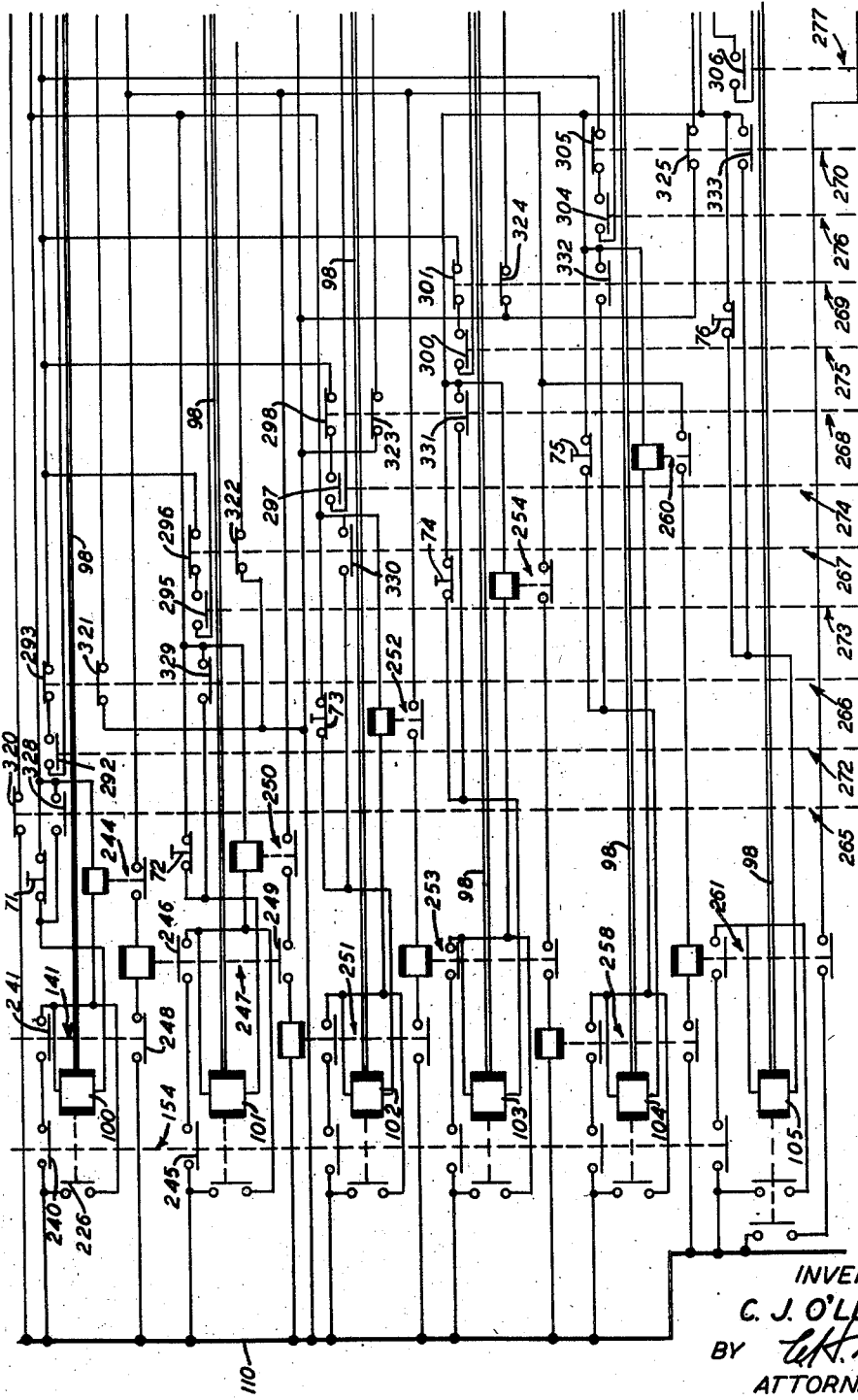
Figure 9:
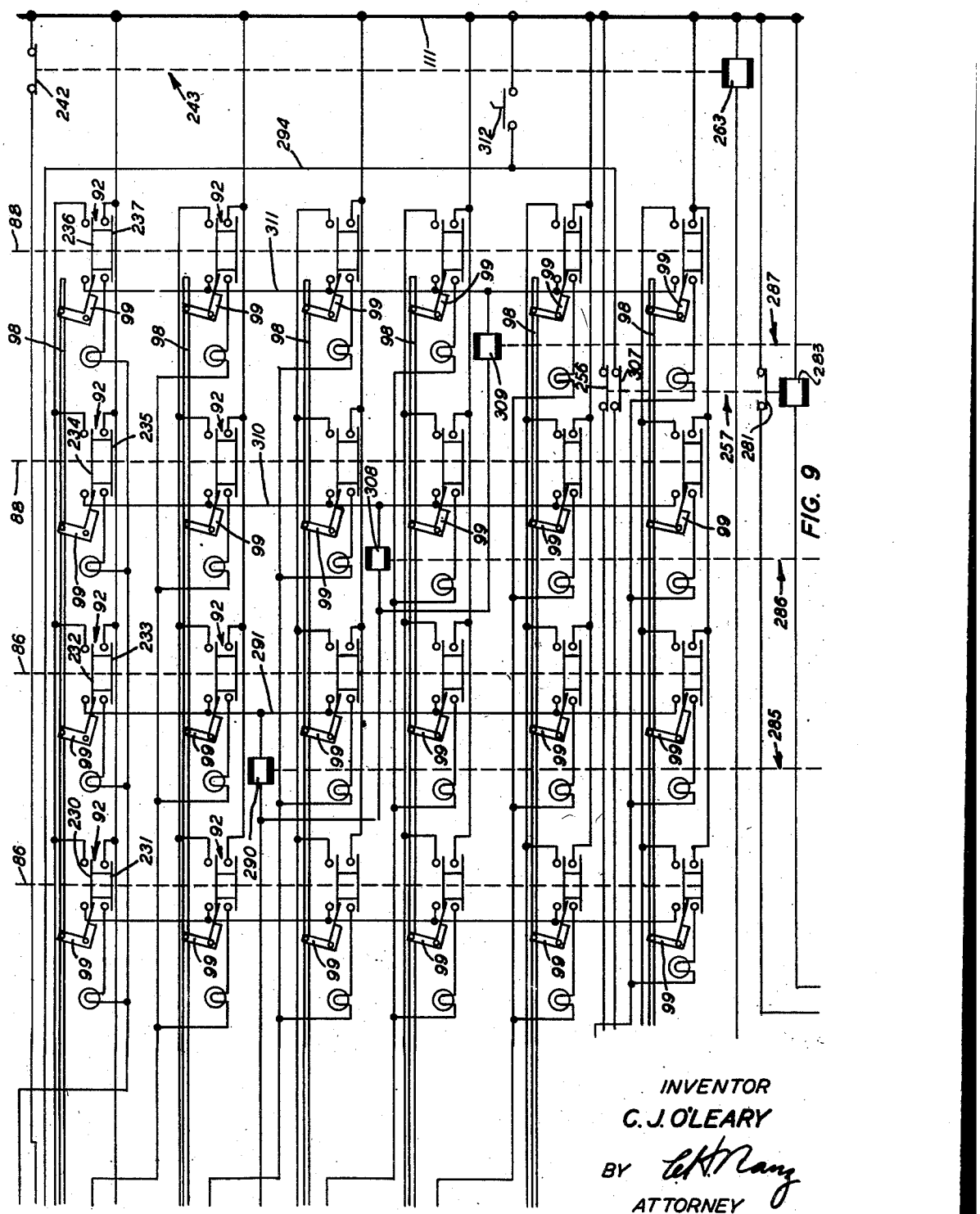
Figure 10:
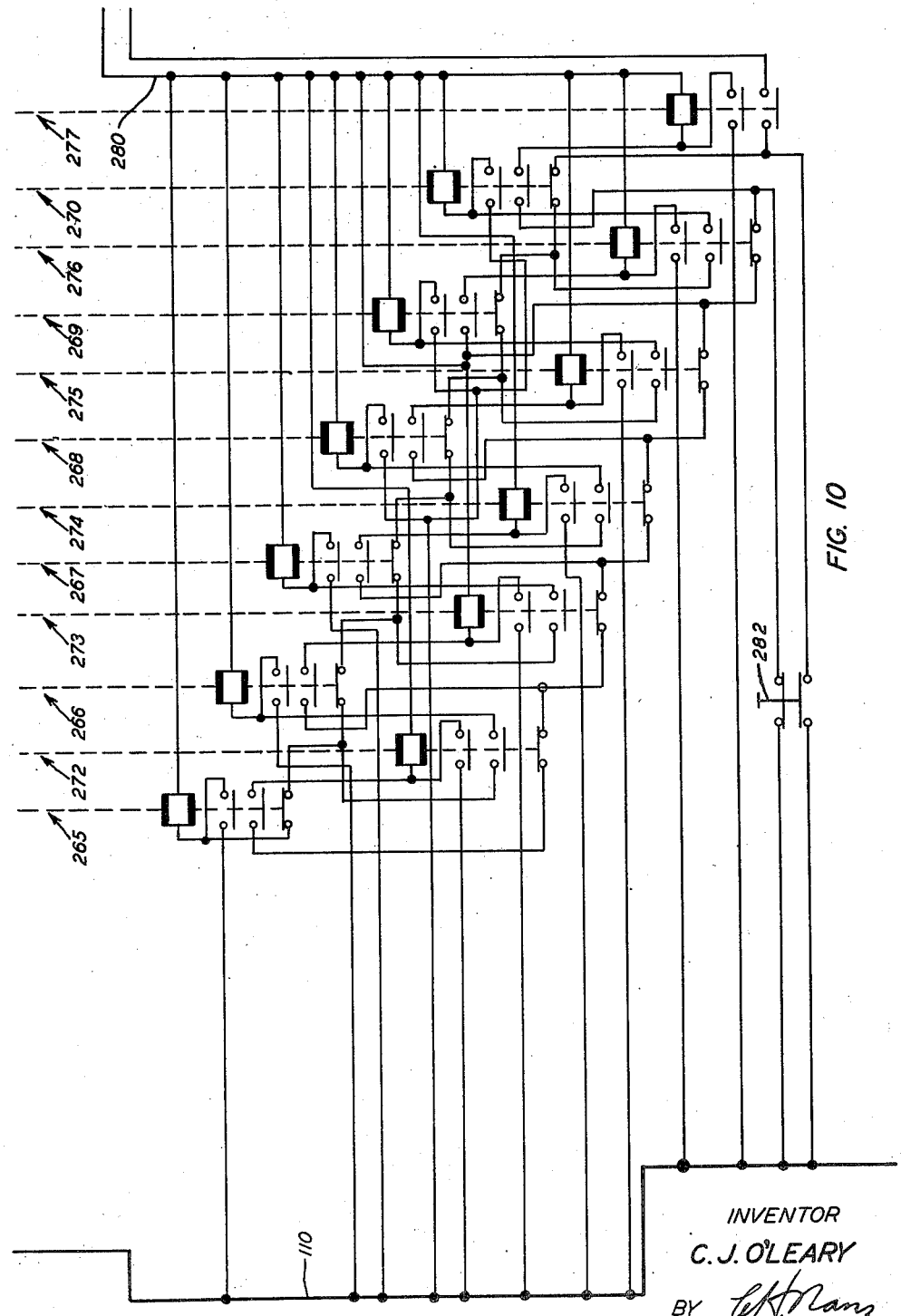

Figs. 6 to 11, inclusive, are schematic circuit diagrams showing portions of the various control circuits for the conveyor apparatus shown in Fig. 1, and are arranged so that when Fig. 7 is placed to the right of Fig. 6, Fig. 8 is placed beneath Fig. 6, Fig. 9 is placed to the right of Fig. 8 and beneath Fig. 7, Fig. 10 is placed beneath Fig. 8, and Fig. 11 is placed to the right of Fig. 10 and beneath Fig. 9, these figures show schematically the entire electrical circuit for controlling the conveyor shown in Fig. 1.

Referring to the drawings, wherein like reference characters designate identical parts throughout the several views, and more particularly to Fig. 1, there is shown a schematic arrangement of a conveyor for selectively conveying materials in tubs from a floor 20 to a plurality of mixing machines 21, 22, 23 and 24 positioned on a floor indicated by the numeral 26. The mixing machines 21 to 24, inclusive, may be of various types depending upon the materials to be mixed therein. However, for the purpose of illustrating the present invention, let it be assumed that the mixing machines are Banbury mixers which operate in a manner well known to the mixing art. The mixing machines 21 to 24, inclusive, are arranged to mix successive batches of ingredients generally used in compounding rubber and rubber-like compounds of the type used for insulating and jacketing electrical conductors. Each batch of material is mixed for a predetermined time, after which the mixing machine discharges the mixed batch into suitable apparatus which prepares the compound for use in conventional extruding machines well known in the art of manufacturing insulated electrical conductors.

The conveyor shown in Fig. 1 comprises a level conveyor section 28 located on the floor 20, on which rectangular tubs 30—30 may be positioned and rolled along manually from left to right as various components of a particular insulating compound are deposited into the tubs. When the tubs receive the proper ingredients for a particular batch of compound, they pass onto a gravity conveyor 31 which directs them to a power driven conveyor 32 positioned at the base of a shaft 34 in which a hoist 35 travels between the floor 20 and the floor 26. The hoist is controlled electrically in a conventional manner so that it is normally positioned at the floor 20 and is provided with a circuit controlling switch actuated by the tubs which cause the hoist to be elevated to the floor 26 each time a tub is positioned on the hoist by the power conveyor 32. The floor of the hoist 35 is provided with conventional anti-friction means (not shown) to permit a tub 30 positioned thereupon to roll off the hoist when it reaches the floor 26.

The tub 30 positioned on the hoist 35 rolls onto a gravity conveyor 36 which conveys the tub to a level, power driven conveyor 38 mounted on the floor 26. The power conveyor feeds the tubs to the mixing machines 21, 22, 23 and 24 by means of spur conveyors 40, 41, 44 and 45 which may be selectively connected to the conveyor 38 by switch sections 48, 49 and 50. The switch sections are operated by motors and associated control circuits so as to direct the tubs to the preselected mixing machine in accordance with a preselected sequence of delivery of the tubs which was determined at the time the empty tubs were positioned on the conveyor 28.

A gravity conveyor 53 carries the empty tubs from the mixing machines to a shaft 55 having a hoist 56 operable therein between the floor 26 and the floor 29. The hoist 56 normally is positioned at the floor 26, and is controlled by suitable electrical circuits so that when an empty tub from one of the mixing machines rolls onto the hoist 56, it actuates limit switches (not shown) positioned in the hoist, the operation of which causes the hoist 56 to be lowered to the floor 29. The hoist delivers the empty tubs to a gravity conveyor 57 mounted on the floor 29 so that the tubs collect at the starting point of the level conveyor 28. Each time an empty tub rolls off the hoist 56, the hoist returns to its position opposite the delivery end of the gravity conveyor 53.

The operation of the hoists 35 and 56 is controlled by conventional electrical circuits and limit switches which do not form any part of the present invention. The structural features of the conveyors are relatively unimportant herein and have not been shown in detail, since general conveyor practices are well understood in the art. It is believed to be sufficient at this point to state that the conveyor 28 is provided with a plurality of rollers, which permit the tubs 30—30 to be rolled therealong as they receive their ingredients for delivery to the mixers 21 to 24, inclusive, that the conveyors 31, 36, 53 and 57 are arranged to continue the movement of the tubs in the proper direction by gravity, and that the power driven sections 32 and 38 of the conveyor serve to carry the tubs at a predetermined rate of speed determined by the operation of the mixing machines.

The conveyor apparatus shown in Fig. 1 is provided with a control panel 60 positioned near the left-hand end of the level conveyor 28, which is connected to the electrical circuits shown in Figs. 6 to 11, inclusive, so that the switch sections 48, 49 and 50 will operate in a sequence determined when each of the tubs enters the conveyor 28. An enlarged view of the control panel 60 is shown in Fig. 2, and as shown, it includes four vertical rows of indicating lamps 61—61 wherein each row consists of three lamps. Each row of lamps is connected to conventional limit switches 62—62 positioned on the spur conveyors 40, 41, 44 and 45 to indicate the number of filled tubs positioned at each of the mixing machines. From this arrangement of the switches 62—62, it can be determined readily which of the Banbury mixing machines has an adequate supply of material tubs 30—30 on hand. The spur conveyors 40, 41, 44 and 45 are designed to have a length sufficient to store a predetermined number of tubs 30—30 thereon in order that an adequate supply of material may be on hand for their respective mixing machine.

The control panel 60 also is provided with four push buttons 64 to 67, inclusive, which are connected in the circuits shown in Figs. 6 to 11, inclusive, so that they control the opertaion of the switch sections 48, 49 and 50. A bank of indicating lamps 70—70 are provided on the control panel 60 beneath the push buttons which are arranged in a manner hereinafter to be described to indicate the sequence of operation of the push buttons 64 to 67, inclusive. On the right hand side of the panel, there is provided a plurality of reset push buttons 71 to 76, inclusive, which permit the preselected destination of any tub to be cancelled so that the particular tub may be assigned to another destination provided the particular tub has not reached the hoist 35.

The batch material tubs 30—30 move along the level conveyor 28 at a rate faster than the hoist 35 can deliver them to the gravity conveyor 36 and the power conveyor 38, in which case, a plurality of tubs collect at the conveyors 31 and 32, with the foremost tub positioned on the power conveyor 32. It is believed to be apparent that while the hoist carries the first tub to the conveyor 36 the circuits controlling the operation of the switches 48, 49 and 50 must be stored in a suitable switch mechanism so that as each tub is delivered to the power conveyor 38 it will be directed to its destination as determined by the sequence operation of the push buttons 64 to 67, inclusive.

Any suitable switch mechanism, which will accomplish the desired results, may be used so long as it is capable of operating in the manner described. One type of switching apparatus which may be used, shown in Figs. 3, 4 and 5, is a coordinate switching mechanism used extensively in the telephone industry and known as a crossbar switch mechanism. A typical crossbar switch mechanism is disclosed in Patent 2,021,329 issued to J. N. Reynolds, November 19, 1935, and in a number of issues of vol. XVII (September 1938 through August 1939) of the Bell Laboratories Record, published by the Bell Telephone Laboratories, Inc. Consequently, the crossbar switch mechanism shown in Fig. 3 will be described herein only insofar as it is necessary for a complete understanding of the invention. Fig. 3 shows a typical crossbar switch mechanism indicated generally at 79, which consists of a rectangular frame having three double element electromagnets 80, 81 and 82 mounted on the left-hand end of the frame, and two double element electromagnets 83 and 84 mounted on the right-hand end of the frame. Horizontal bars 86 to 90, inclusive, are suitably journalled in the ends of the frame so that each electromagnet is arranged to rotate one of the selecting bars a small amount in either direction depending on which element of the magnet is energized. Ten vertical columns of contact members 92—92 are resiliently mounted on vertical supports 93—93. The contact members of each column are arranged in ten groups of contacts, or two groups per bar, so that a group of contact members is positioned slightly above the selecting bar and another group of contact members is positioned slightly below the seletcing bar. Each group of contacts may contain as many normally open contacts as the circuit requires, like the normally open contacts 94—94 and 95—95 which are resiliently secured to the supports 93—93 by springs 96—96 (Fig. 4).

The selecting bars 86 to 90, inclusive, are provided with resilient selecting fingers 97—97 (Figs. 3, 4 and 5) which extend inwardly from the selecting bars at points adjacent to each group of contacts of the vertical columns of the contact members 92—92. When the selecting bars are in their normal position, the resilient fingers are aligned with the opening between its respective group of contact members. When the bars are rotated in either direction (Fig. 4), by their associated electromagnet, the resilient fingers assume their dotted line position as seen in Fig. 4, across the backs of the upper group of contacts of each vertical column, and when they are rotated in the opposite direction the resilient fingers are positioned in back of the lower group of contacts of each vertical column of contact members.

A holding bar 98 is pivotally mounted between the top and bottom members of the frame adjacent to each vertical column of contact members 92—92. The holding bars 98—98 are actuated by electromagnets 100 to 109, inclusive, suitably mounted along the base of the rectangular frame of the crossbar switch mechanism. When the electromagnets 80 to 84, inclusive, are energized, they rotate their associated selecting bar so as to move all the resilient fingers thereon directly behind the upper contacts 94—94 or the lower contacts 95—95 of each group of contacts. When one of the holding magnets 100 to 109, inclusive, are subsequently energized, it turns the pivotally mounted holding bar so that it engages the end of the resilient finger positioned adjacent to the vertical column associated with the energized coil and closes the contact members at that particular position. The holding bar remains operated until its associated magnet coil is deenergized, but the selecting bar returns to its normal position immediately after the holding bar is operated. When the selecting bar returns to its central position, all the fingers return with it except the one held by the holding bar, thus, leaving the particular selecting bar free for operation with a different holding bar 98 of the coordinate switch mechanism. The resilient fingers which remain in their normal position are moved between the upper and lower groups of contacts, and therefore, do not actuate any of the contacts of the vertical column of contact members 92—92.

In using a crossbar switch mechanism like that described, to control the conveyor system shown in Fig. 1, an electromagnet for operating the selecting bars must be provided for each mixing machine, in which case, only two selecting bars and four electromagnets are needed in the electrical circuits shown in Figs. 6 to 11, inclusive. The number of horizontal holding bars 98—98 and their associated electromagnets 100 to 109, inclusive, is determined by the number of circuits which must be stored up in the mechanism for the tubs waiting on the conveyors 31 and 32 to be picked up by the hoist 35. Only six holding circuits are illustrated in the electrical circuit diagram for the purpose of illustrating certain features of the invention.

Referring now to the schematic wiring diagram shown in Figs. 6 to 11, inclusive, there is provided a pair of low voltage busses 110 and 111 which supply a suitable D. C. potential to the electrical apparatus required to control the operation of the switches 48, 49 and 50 of the conveyor 38. Referring particularly to Fig. 6, an operating coil 114 of a relay 115 is connected across the busses 110 and 111 in series with a normally open contact 116 provided on a relay 117, a normally closed contact 120 provided on a relay 121, a normally closed contact 125 provided on a relay 126, a normally closed contact 128 provided on a relay 129, and a normally closed contact of the push button 64. Each of the push buttons 64 to 67, inclusive, is provided with a normally closed and a normally open contact.

The relay 117 (Fig. 6) has its operating coil 130 connected across the busses 110 and 111 in series with the normally open contact of the push button 64. When the push button 64 is actuated to close its normally open contact, the coil 130 is energized and closes its normally open contact 116. Energization of the coil 130 also closes its normally open contact 132 which connects a coil 134 of a relay 135 directly across the busses 110 and 111. Energization of the coil 134 closes its normally open contact 136 which in turn connects a magnet coil 137 (Fig. 7) of the double element electromagnet 80 directly across the busses 110 and 111. An operating coil 140 of a relay 141 is connected across the busses 110 and 111 in series with a parallel circuit including a normally open contact 138 of the relay 135, a normally open contact 143 of a relay 144, a normally open contact 146 of a relay 147, and a normally open contact 150 of a relay 151. An operating coil 153 (Fig. 6) of a relay 154 is connected across the busses 110 and 111 in series with a parallel circuit including normally open contacts 155, 156, 160 and 162 provided on relays 115, 157, 161 and 163, respectively. An operating coil 165 of the relay 157 is connected across the busses 110 and 111 in series with a contact 166 provided on the relay 117, a normally open contact 167 of the relay 121, a normally closed contact 170 provided on the relay 126, a normally closed contact 171 provided on the relay 129 and the normally closed contact of the push button 65.

A coil 173 (Fig. 6), of the relay 121, is connected directly across the busses 110 and 111 in series with the normally open contact of the push button 65. A coil 174 of the relay 144 is connected across the busses in series with a normally open contact 175 of the relay 121. An operating coil 177 (Fig. 7), of the double element magnet 80 is connected across the busses in series with a normally open contact 178 of the relay 144. An operating coil 180 (Fig. 6) of the relay 161 is connected across the busses in series with a normally closed contact 181 of a relay 117, a normally closed contact 182 of the relay 121, a normally open contact 183 of the relay 126, a normally closed contact 185 of the relay 129 and the normally closed contact of the push button 66. An operating coil 187 of the relay 126 is connected across the busses 110 and 111 in series with the normally open contact of the push button 66. Energization of the coil 187 closes a normally open contact 190 which energizes an operating coil 191 of the relay 147. The coil 191 closes a normally open contact 194, which in turn, connects an operating coil 193 of the double element magnet 81 across the busses 110 and 111. Actuation of the push button 66 energizes the operating coils 187 and 191 of the relays 126 and 147, respectively, which in turn, connect the operating coil 193 of the magnet 81 across the busses. Closure of the relay 147 energizes the relay 141. When the button 66 is released, it energizes the relay 161 which in turn energizes the relay 154.

An operating coil 195 (Fig. 6) of the relay 163 is connected across the busses 110 and 111 in series with normally closed contacts 196, 197 and 198 of the relays 117, 121 and 126, respectively, normally open contact 200 of the relay 129, and the normally closed contact of the push button 67. An operating coil 202 of the relay 129 is connected across the busses in series with the normally open contact of the push button 67. An operating coil 203 of the relay 151 is connected across the busses in series with a normally open contact 204 of the relay 129. The coil 206 (Fig. 7) of the double element magnet 81 is connected across the busses in series with a normally open contact 207 (Fig. 6) of the relay 151. The relays 129 and 163 each have a time delay mechanism like that described for the relays 126 and 161.

An operating coil 210 (Fig. 7) of a relay 211, is connected across the busses 110 and 111 in series with normally closed contacts 212, 213, 214 and 215 provided on the relays 135, 144, 147, 151, the normally open limit switch 217 and a normally closed limit switch 218. The relay 211 is provided with a normally open contact 219 which is connected in parallel with the normally open limit switch 217, and a second normally open contact 221 which connects an alarm bell 220 across the busses when the coil 210 is energized.

Each of the relays 115, 117, 121, 126, 129, 157, 161 and 163 (Fig. 6) is provided with a time delay mechanism which is arranged to hold their respective contacts in their actuated positions for a predetermined period of time after their respective operating coils are deenergized by the release of their associated push buttons 64 to 67, inclusive. Thus, when the push button 64 is actuated to energize the coil 130 of the relay 117, the normally open contacts 116 and 132 are closed and remain closed after the push button is released. Upon its release, it energizes the coil 114 of the relay 115 before the contact 116 of the relay 117 opens, while the contact 132 of the relay maintains the coil 134 across the busses. As a result, the magnet coil 137 of the double element magnet 80 is energized and operates its respective resilient fingers before the contacts 116 and 132 drop open. The relay 115 is held in its actuated position by its time delay mechanism after the relay 117 drops open. This same arrangement takes place upon the actuation of each of the push buttons 64 to 67, inclusive, with respect to the relays 115, 117, 121, 126, 129, 157, 161 and 163.

Referring now to Figs. 8 and 9, it should be noted that only six holding magnets, namely, 100 to 105, inclusive, are shown on the drawings in connection with the double element magnets 80 and 81 described in connection with Figs. 6 and 7. The left hand vertical row of contact members 92—92 is shown in a horizontal position in Fig. 9 and the normally horizontal selecting magnets 80 and 81 and their respective selecting bars 86 and 87 are shown in a vertical position to simplify the wiring diagram. Each of the holding coils 100 to 106, inclusive, has associated therewith a normally open contact shown in Fig. 8 which closes each time the coil is energized, and six pairs of normally open contacts as shown in Fig. 9. Since the same arrangement of contacts prevails throughout the coordinate switch mechanism, only the normally open contact 226 adjacent to the coil 100, the normally open contacts 230 and 231 associated with the coil 137, the normally open contacts 232 and 233 associated with the coil 177, and the contacts 234 and 235 associated with the magnet coil 133 and the contacts 236 and 237 associated with the coil 206 are identified by numbers on the drawing for the purpose of illustrating the operation of the coordinate switch mechanism.

The magnet coil 100 (Fig. 8), which turns the extreme left-hand holding bar 98 (Fig. 3), is connected across the busses 110 and 111 in series with the normally open contacts 240 and 241 of the relays 154 and 141, respectively, the reset push button 71 and a normally closed contact 242 provided on a relay 243. The normally open contact 226 bridges the normally open contacts 240 and 241 and thereby maintains the coil 100 across the busses 110 and 111 after the relays 141 and 154 are deenergized upon the opening of the relays 115 and 117 when their time delay mechanisms complete their respective operating cycles. A relay 244 has its operating coil connected in parallel with the magnet coil 100 and the reset button 71, and has its normally open contact connected across the busses 110 and 111 in series with the operating coil of a relay 247 and a normally open contact 248 provided on the relay 141.

The magnet coil 101 is connected across the busses 110 and 111 in series with a normally open contact 245 on the relay 154, a normally open contact 246 of the relay 247, a normally closed push button 72 mounted on the panel 60, and the normally closed contact 242 of the relay 243. The normally open contact of the coil 101 is connected in parallel with the contacts 245 and 246 so that it maintains the coil across the busses after the contacts 245 and 246 drop open. A relay 250 has its operating coil connected in parallel with the coil 101 and the push button 72, and its normally open contact connected across the busses in series with a normally open contact 249 of the relay 247 and an operating coil of a relay 251. The relay 251 is provided with two normally open contacts like the contacts 246 and 249 of the relay 247. The magnet coil 102 (Fig. 8) is connected across the busses in series with normally open contacts provided on the relays 154 and 251, a normally closed push button 73 and the normally closed contact 242 (Fig. 9) of the relay 243. A normally open contact associated with the coil 102 is connected in parallel with the contacts of the relays 154 and 251. A relay 252 has its coil connected in parallel with the coil 102, and its normally open contact across the busses in series with a normally open contact on the relay 251 and the operating coil of a relay 253.

The remaining magnet coils 103, 104 and 105 (Fig. 8) are connected across the busses 110 and 111 in the manner described above in conjunction with contacts provided on relays 253, 258, 261, respectively, their associated reset push buttons 74, 75 and 76, respectively, and the relays 254 and 260, respectively. However, the magnet coils 103, 104 and 105 are maintained across the busses 110 and 111 after the relays 141 and 154 are deenergized, through their respective normally open contacts and a normally closed contact 256 provided on a relay 257. The relays 244, 250, 252, 254 and 260 are provided with a timing mechanism to retard the closing of their contacts when their respective coils are energized. A second normally open contact associated with the magnet coil 105 connects an operating coil 263 of the relay 243 directly across the busses in series with a normally open contact provided on the relay 261.

Fig. 10 shows a series of sequence selector relays which are electrically interlocked with each other so as to energize the indicating lamps in the lamp bank 70, and operate the switches 48, 49 and 50 of the conveyor 38 in accordance with the circuits stored up in the coordinate switch mechanism shown in Figs. 8 and 9 by the successive operation of the push buttons. Six relays 265 to 270, inclusive, control the operation of the indicating lights in the lamp bank 70, and six relays 272 to 277, inclusive, control the operation of the switches 48, 49 and 50. Each of the relays 265 to 270, inclusive, and 272 to 276, inclusive, is provided with two normally open contacts and a normally closed contact which are connected to obtain sequential operation of the relays upon successive operation of a limit switch 282 having a normally open and a normally closed contact and positioned so as to be actuated by the hoist 35. The first operation of the switch 282 closes its normally open contact and it connects the operating coil of the relay 265 across the bus 110 and an intermediate bus 280 in series with normally closed contacts on the relays 270, 269, 268, 267, 266 and 265 in the order named or in the reverse order of their numeral designation. One of the normally open contacts on the relay 265 is connected in parallel with its own normally closed contact to maintain the coil connected across the busses 110 and 280 when the switch 282 returns to its normal position. The intermediate bus 280 is connected to the bus 111 through a normally closed contact 281 provided on the relay 257. The relay 257 has its operating coil 283 connected across the busses 110 and 111 in series with a normally open contact of the relay 270 and the normally open contact on the limit switch 282.

When the switch 282 returns to its normal position, its normally closed contact connects the operating coil of the relay 272 across the busses 110 and 280 in series with normally closed contacts provided on the relays 276, 275, 274, 273, 272 and a second normally open contact provided on the relay 265. The relay 272 has one of its normally open contacts connected in parallel with these normally closed contacts to maintain the relay energized when the switch 282 is actuated again by the hoist. The next succeeding operation of the limit switch 282 by the hoist closes its normally open contact and connects the operating coil of the relay 266 across the busses 110 and 280 in series with the normally closed contacts provided on the relay 270, 269, 268, 267, 266 and a second normally open contact which is closed by the prior energization of the relay 272. Likewise, the subsequent closure of the normally closed contact of the switch 282 connects the operating coil of the relay 273 across the busses 110 and 280 in series with the normally closed contact on the relays 276, 275, 274 and 273 in the order named, and a second normally open contact of the relay 266. Each time the relays 265 to 270, inclusive, and 272 to 277, inclusive, are actuated by successive operation of the limit switch 282, they maintain themselves energized across the busses 110 and 280 and in so doing they set up a circuit for the energization of the next succeeding relay in its respective series. For example, the relay 265 sets up a circuit for the relay 266 and the relay 266 sets up a circuit for the relay 267 and so on through the respective series of relays. Likewise, the relay 272 sets up a circuit for the relay 273, which in turn, sets up a circuit for the relay 274 and so on throughout the entire series of relays in its respective series.

The switch sections 48, 49 and 50 of the conveyor 38 (Fig. 2) are arranged to be actuated by motors controlled by relays 285, 286 and 287, respectively, as shown in Figs. 9 and 11. The relay 285 (Fig. 9) is provided with an operating coil 290, which has one end terminal thereof connected to the bus 110 and the other terminal thereof connected to an intermediate bus 291. The intermediate bus 291 is connected to a second intermediate bus 294 in series with a normally open contact 232 of the first pair of contacts in the second vertical row of contacts, a normally open contact 292 provided on the relay 272 (Fig. 8) and a normally closed contact 293 provided on the relay 266, or a normally open contact of the second pair of contacts in the second row of vertical contacts, a normally open contact 295 provided on the relay 273 and a normally closed contact 296 provided on the relay 267, or a normally open contact of the third pair of contacts in the second row of contacts, a normally open contact 297 provided on the relay 274 and a normally closed contact 298 provided on the relay 268, or a normally open contact of the fourth pair of contacts in the second row of contacts, a normally open contact 300 provided on the relay 275, and a normally closed contact 301 provided on the relay 269, or a normally open contact of the fifth pair of contacts in the second row of contacts, a normally open contact 304 provided on the relay 276, and a normally closed contact 305 provided on the relay 270, or a normally open contact of the sixth pair of contacts in the second row of contacts, a normally open contact 306 provided on the relay 277, and a normally closed contact 307 provided on the relay 257. Thus, the operating coil 290 of the relay 285 is connected across the bus 110 and the intermediate bus 294 when any one of the holding coils 100 to 105, inclusive, is energized in conjunction with the energization of the coil 177 of the double element magnet 80.

The operating coil 308 (Fig. 9) of the relay 286 has one terminal thereof connected directly to the bus 110 and the other terminal thereof connected directly to an intermediate bus 310 which is common to one of the normally open contacts of each pair of contacts in the third vertical row of contacts of which the first pair are numbered 234 and 235. Likewise, the operating coil 309 of the relay 287 has one terminal connected to the bus 110 and the other terminal connected to an intermediate bus 311 which is common to one of the normally open contacts of each pair of contacts in the fourth vertical row of contacts of which the first pair are numbered 236 and 237. The intermediate busses 310 and 311 are connected to the bus 294 in the same manner as that described for the bus 291. The intermediate bus 294, which is common to the busses 291, 310 and 311, is connected to the bus 111 through a normally open limit switch 312 which is positioned adjacent to the gravity conveyor 36 (Fig. 2) so that it is actuated by the tubs 30—30 as they travel from the hoist to the conveyor 38. The power conveyor 38 terminates at a conveyor 40 which feeds the tubs to the first Banbury mixer 21, and, therefore, does not require any switch section for the mixing machine 21. Therefore, one contact of each pair of normally open contacts of the first vertical row of contacts is open circuited. When the limit switch 312 is closed by a material tub, it completes a circuit for the coils 290, 308 and 309, of the relays 285, 286 and 287 which includes a contact in one of the three vertical rows of contacts of the coordinate switch mechanism.

The lamps in the lamp bank 70 (Figs. 2 and 9), provided on the control panel 60, are arranged to indicate the sequence of operation of the push buttons 64 to 67, inclusive, as the material tubs 30—30 are dispatched on the conveyor 28. The lamps are shown in Fig. 9 in the same manner as they are shown on the panel 60 (Fig. 2), that is, in four vertical rows of six lamps each, one row of lamps being provided for each of the push buttons 64 to 67, inclusive. The first lamp in each vertical row has one terminal thereof connected together and to the bus 110 in series with a normally closed contact 320 of the relay 265 and the other terminal thereof connected to one side of the adjacent normally open contact of the first pair of contacts of each vertical row of contacts of the coordinate switch mechanism. The other sides of these contacts are connected together and to the bus 111. The second lamp of each vertical row of lamps is connected in a similar manner except that each lamp is in series with a normally closed contact 321 of the relay 266. The third, fourth, fifth and sixth lamps in each row are connected in series with normally closed contacts 322 to 325, inclusive (Fig. 7), provided on the relays 267 to 270, respectively.

As pointed out hereinabove, the push buttons 71 to 76, inclusive, mounted on the control panel 60 are provided for the purpose of cancelling a preselected destination of a particular batch material tub in order that it may be redirected to another destination. However, the cancellation of the preselected destination must be made while the particular tub is resting on the gravity conveyor 31 or the power conveyor 32. This arrangement is illustrated in Figs. 8 and 9 which show that the push buttons 71 to 76, inclusive, are bridged by normally open contacts 328 to 333, inclusive, provided on relays 265 to 270, respectively. When the first tub placed on the conveyor 28 rolls on the hoist 35 and the hoist leaves the bottom of the shaft and allows the limit switch 282 to resume its normal position, the operation of the relays 265 closes the contact 328. Thereafter the operation of the reset push button 71 will not open the circuit to the particular holding coil because the contact 328 bridges the normally closed contact of the reset push button. It should be noted that while the limit switch 282 is described as being operated by the hoist 35, it may be positioned at some other point on the conveyor system so as to be actuated by the tub itself, in which case, a greater period of time may be provided for cancelling the preselected destination of the batch material tubs 30—30.

Fig. 11 is a schematic wiring diagram of the circuits controlling the operation of the motors provided for actuating the switches 48, 49 and 50. The electrical apparatus associated with the motor control receives its potential from the busses 335 and 336 which may be connected to a suitable source of A. C. potential. The relay 285 (Fig. 8) is provided with a normally open contact 340 which connects an operating coil 341 of a relay 342 across the busses 335 and 336 in series with a normally closed contact 343 provided on a relay 344 and a normally closed limit switch 345 positioned to be actuated to its open position by movement of the switch 48 into alignment with the gravity conveyor 41. A relay 342 is provided with a normally open contact which is connected in parallel with the contacts 340 and 343 so as to maintain the coil 341 across the busses when the contacts 340 and 343 are opened.

The operating coil 347 (Fig. 11) of the relay 344 is connected across the busses 335 and 336 in series with a normally open limit switch 350 and a normally closed limit switch 348. The limit switch 350 is positioned adjacent to the gravity conveyor 41 so that it is actuated to its closed position by a tub passing along the conveyor 41 and the limit switch 348 is positioned so as to be held in its open position by the switch 48 when it is aligned with the power conveyor 38. The relay 344 is provided with a normally open contact connected in parallel with the normally open limit switch 350. The relay 344 is provided with a second normally open contact which connects a coil 351 of a relay 352 across the busses. The relay 342 also is provided with a second normally open contact which is connected in parallel with the last-mentioned normally open contact of the relay 344. Energization of the coil 351 connects a motor 353, which is arranged to open and close the switch 48, across a suitable three-phase power supply indicated generally at 354.

The switches 49 and 50 are operated by similar electric circuits controlled by the relays 286 and 287. The relay 286 is provided with a normally open contact 355 which is connected in series with the operating coil of a relay 356, a normally closed contact provided on a relay 357 and a normally closed limit switch 360 positioned to be actuated by the switch 49. The relay 356 is energized through a normally open limit switch 362 and a normally closed limit switch 361. The relay 357 is provided with a normally open contact which is connected in parallel with the normally open limit switch 362. Alternate energization of the relays 356 and 357 connects the operating coil of a relay 358 directly across the busses through normally open contacts provided on the relays. The relay 358 connects a motor 355, which is arranged to open and close the switch 49, across the power supply 354. Energization of the motor 355 positions the switch 49 in alignment with the gravity conveyor section 44 and thereby connects the conveyor 38 to the mixing machine 23.

When the relay 287 (Fig. 9) is energized, a normally open contact 364 provided thereon connects the operating coil of a relay 366 across the busses 335 and 336 in series with a normally closed contact provided on a relay 367 and a normally closed limit switch 370. The relay 366 is provided with a normally open contact connected in parallel with the normally closed contact of the relay 367 and the limit switch 370. The relay 367 has its operating coil connected across the busses in series with the normally closed limit switch 371 and a normally open limit switch 372. The relay 367 is provided with a normally open contact connected in parallel with the limit switch 372. Alternate energization of the relays 366 and 367 connects the operating coil of a relay 368 across the busses. Energization of the relay 368 connects a motor 365 which is arranged to open and close the switch 50 of the conveyor 38, to the potential supply 354. The limit switches 370, 371 and 372 are positioned on the conveyor 38 with respect to the switch section 50 in the same manner that the limit switches 345, 348 and 350 are positioned with respect to the switch 48.

Operation

The conveyor shown in Fig. 1 is designed to deliver tubs 30—30 having a selected batch of ingredients therein for the mixing machines 21 to 24, inclusive. In the manufacture of electrical conductors, such a conveyor system may be arranged to supply such a group of mixing machines with different types of insulating or jacketing compounds, such as, rubber compounds, Buna S compounds or Neoprene compounds. In such a system the destination of a tub containing ingredients to be mixed in a particular mixing machine must be determined at the time the tub is first placed on the conveyor 28 due to the fact that all the tubs are delivered to their respective destinations on a single conveyor. The ingredients for the various compounds to be mixed in the mixing machines are stored in large quantities on the floor 29. A suitable supply of each ingredient is positioned along the level conveyor 28. The conveyor system is arranged so that an adequate supply of batch material tubs 30—30 may be stored at each of the mixing machines 21 to 24, inclusive, in order that a reasonable quantity of empty tubs always is available at the beginning of the level conveyor 28.

Let it be assumed that the busses 110 and 111 are connected to a 50 v. D. C. voltage supply source, that the busses 335 and 336 are connected to a 110 v. A. C. supply source that one or more filled tubs 30—30 are positioned on the spur conveyors 40, 41, 44 and 45 and that several empty tubs are positioned on the conveyor 47. Let it be further assumed that no material tubs 30—30 are positioned on the conveyors 31 and 32. An empty batch material tub 30 is moved from the conveyor 57 onto the level conveyor 28 and at that time a dispatcher located at the control panel 60 determines from the indicating lamps 61—61 provided on the panel 60, which of the mixing machines 21 to 24, inclusive, is to receive the next tub of material.

Assuming that the indicating lamps 61—61 provided on the control panel indicate that the mixing machine 22 has less material tubs waiting on the spur conveyor 41 than the other spur conveyors, the operator depresses a push button 65. After the operator stationed at the control panel 60 presses the button 65, he places suitable indicia on the tub 30 to indicate to other operators positioned along the level conveyor 28 the particular ingredients that are to be deposited in the tub.

The dispatcher continues to move empty tubs onto the conveyor 28 and operates the push buttons 64 to 67, inclusive, in accordance with the quantity of tubs stored at each of the mixing machines as indicated by the lamps 61—61 provided on the panel 60. The filled tubs 30—30 leave the end of the conveyor 28 and pass onto a gravity conveyor 31 which carries the tubs to a short power conveyor 32 positioned at the entrance of the shaft 34.

The tubs 30—30 have their respective ingredients placed therein and move along the level conveyor 28 at a rate greater than the rate at which the hoist 35 and the conveyor 38 can deliver the filled tubs to their respective mixing machines 21 to 24, inclusive. As a result, a number of filled tubs 30—30 collect on the conveyor 31 and await their turn to be carried by the hoist 35 to the gravity conveyor 36 which conveys the tubs to the level power conveyor 38 positioned on the floor 26.

Let it be assumed, that as the next succeeding five empty tubs were placed on the conveyor 28, the dispatcher operated the push buttons 64 to 67, inclusive, in the following order: 67, 66, 64, 64 and 67. It should be noted, that while the push buttons 64 to 67, inclusive, were operated in the above-mentioned sequence, the interval of time between the operation of the push buttons is substantially less than the time required for each tub to pass along the conveyor 28 and be delivered to its respective mixing machine. As a result, the tubs collect on the conveyor 31 and the control circuit controlling the destination of each tub in accordance with the operation of each button must be registered in the coordinate switching apparatus shown in Fig. 3, while the tubs wait to be carried in turn to the conveyor 38 by the hoist 35. This feature of the invention will be understood more readily if the response of the control apparatus shown in Figs. 6 to 11, inclusive, is noted as each push button is operated.

The push button 65 (Fig. 7), which was the push button operated by the dispatcher when the first tub was placed on the conveyor 28 closes its normally open contact and connects the operating coil 173 of the relay 121 directly across the busses 110 and 111. Operation of the relay 121 connects the coil 174 of the relay 144 across the busses 110 and 111 and the coil 165 of the relay 157 across the busses in series with the open contact of the push button 65 and the normally closed contacts 170 and 171. Energization of the operating coil of the relay 144 closes its normally open contact 173 which in turn connects the operating coil 177 of the double-acting magnet 80 (Fig. 7) of the coordinate switch mechanism directly across the busses 110 and 111. Energization of the coil 177 rotates the selecting bar 86 and places the resilient fingers attached thereto behind each pair of normally open contacts of the second vertical row of contacts (Fig. 9), of which the first pair of contacts is indicated by the numerals 232 and 233. Energization of the operating coil 174 also closes the contact 143, which in turn, connects the coil 140 of the relay 141 across the busses 110 and 111 and thereby closes its contact 241 provided in the control circuit of the holding coil 100.

When the push button 65 is released, the coil 165 of the relay 157 is energized and closes its normally open contact 156 which connects the operating coil 153 of the relay 154 directly across the busses 110 and 111. The time delay mechanism of the relay 121 holds its contacts in their actuated position, and, consequently, holds the operating coils 174, 177 and 140 across the busses after the push button is released. The energization of the relay 154 closes the normally open contact 240, which in turn, connects the holding magnet coil 100 across the busses 110 and 111 in series with the closed contact 241 of the relay 141, the normally closed push button 71 and the normally closed contact 242 provided on the relay 243. Energization of the coil 100 also closes its normally open contact 226. The contact 226 maintains the coil 100 across the busses when the contacts 240 and 241 drop open upon the expiration of the operating period of the time delay mechanism of the relays 121 and 157. The coil 100 turns its respective holding bar 99 against the resilient fingers previously positioned adjacent to the first pair of normally open contacts 232 and 233 (Fig. 8).

The holding bar 99, actuated by the coil 100, only closes the contacts 232 and 233 because resilient fingers associated with the contacts 230—231, 234—235, and 236—237 are in their neutral position and pass between the groups of contacts associated with the holding coil 100. Soon after the holding magnet 100 closes the contacts 232 and 233, the time delay mechanism of the relay 121 releases the contacts to their normal deenergized positions. As a result, the relays 141 and 144, and the magnet 80 drop open, whereupon the selecting bar 86 and its associated resilient fingers return to their normal position with the exception of the resilient fingers clamped between the holding bar 99 and the contacts 232 and 233.

It should be noted that when the holding coil 100 was energized and closed its normally open contact 226, the coil of the relay 244 was energized. However, the retarding mechanism of the relay 244 prevents it from closing its normally open contact before the relay 141 drops open and opens the contacts 241 and 248. This arrangement is provided to prevent the holding coil 101 from being energized immediately after the coil 100 is energized, whereby the operation of the button 65 energizes only the holding coil 100. After the relay 141 is deenergized by the opening of the relay 121, the relay 244 closes its contact and thereby sets up a circuit for the relay 247 and the holding coil 101 to be used by the next operation of one of the push buttons.

The operation of the above-mentioned relays takes place immediately upon the actuation of the button 65, and since these relays operate in a very short period of time, the material tub associated with the operation of the push button 65 has not reached the power conveyor 32.

The second tub was placed on the conveyor 28 with the operation of the push button 67, which indicates that the destination of the second tub is the mixing machine 24. Actuation of the push button 67 (Fig. 7) closes its normally open contact and connects the coil 202 of the relay 129 across the busses 110 and 111. The closed contact 200 of the relay 129 (Fig. 6) connects the coil 195 of the relay 163 across the busses 110 and 111 in series with the normally closed contacts 196, 197 and 198 of the relays 117, 121 and 126, respectively, and the open contact of the push button 67. The closed contact 204 energizes the coil 203 of the relay 151, which in turn, closes its contact 207 and connects the coil 206 of the bouble-acting magnet 81 across the busses 110 and 111. The closure of the contact 150 energizes the relay 141 to close the contacts 241 and 248. The contact 248 energizes the relay 247 through the closed contact of the relay 244, whereby the relay 247 closes its contacts 246 and 249. The energization of the coil 206 turns its associated selecting bar 88 so as to position its resilient fingers adjacent to all the normally open contacts of the fourth vertical row of contacts, of which the first pair are numbered 236 and 237 (Fig. 9).

When the push button 67 is released, it connects the coil 195 across the busses in series with the contact 200 of the relay 129. The coil closes its contact 162 which energizes the relay 154 and closes all its normally closed contacts, of which the contact 245 completes the circuit to the holding coil 101 through the contact 246 of the relay 247 and the normally closed reset button 72. The energization of the coil 101 turns its respective holding bar, which in turn, presses the resilient finger of the selecting bar 88 against the second pair of contacts in the fourth vertical row and closes them. The other resilient fingers attached to the selecting bar 88 (Fig. 9) pass between the contacts comprising the third and fourth vertical rows of contacts of the coordinate mechanism 79. The time delay mechanism of the relay 129 releases its associated contacts immediately after the coil 101 is energized, consequently, the relays 141, 154, and 247 and the double-acting magnet 81 drop open. The closed contact operated by the holding coil 101 maintains the coil across the busses and thereby keeps the second pair of contacts associated with the coil 206 of the coordinate switch mechanism closed. The time delay mechanism of the relay 163 holds the relay 154 energized after the relay 129 drops open for a period of time sufficient for the coil 101 to close. The coil of the relay 250 is energized when the coil 101 closes its contact, but the time delay in closing mechanism of the relay 250 prevents it from closing before the relay 141 drops open and deenergizes the relay 247. This prevents energization of the relay 251 and subsequent energizing of the holding coil 102 at this time. Thus, the operation of the relay 154 energizes only the first open circuited holding coil, namely 101, when counting down from the coil 100 in Fig. 7, when the push button 67 is actuated.

The operation of the push button 66 when the third tub 30 was placed on the conveyor 28, energizes the coil 187 of the relay 126 and operates its associated normally open and normally closed contacts. Energization of the relay 126 picks up the relays 147, 141, 247 and the relay 251 through the closed contact of the relay 250 in the manner described for the operation of the relays 121 and 129 and energizes the coil 193 of the double-acting magnet 80. Energization of the relay 251 sets up a circuit for the holding coil 102 through a normally open contact of the relay 154 in the same manner that the contact 245 of the relay sets up the circuit for the coil 101. The operation of the coil 193 positions the resilient fingers of the selecting bar 88 adjacent to the third vertical row of normally open contacts (Fig. 9), of which the first pair are numbered 234 and 235.

When the push button 66 is released, it energizes the relay 161 which in turn energizes the relay 154. Energization of the relay 154 closes its normally open contacts, one of which completes the circuit for the holding coil 102 through the normally closed push button 73. The coil 102 turns its respective holding bar, which in turn, presses the resilient finger adjacent to the third pair of contacts of the third vertical row of contacts and closes them. The coil of the relay 252 is energized when the coil 102 closes its normally open contact and seals itself closed, but the time delay in closing mechanisms of the relay 252 prevents it from closing before the relay 141 drops open. This prevents the energization of the relay 253 and subsequent energization of the coil 103 when the push button 66 is actuated. Therefore, the operation of the relay 154 energizes only the first open circuited holding coil, namely the coil 102 of the coordinate switch mechanism.

The operation of the push button 64, when the fourth tub 30 was placed on the conveyor 28, connects the operating coil 130 and the relay 117 across the busses 110 and 111. Energization of the relay 117 picks up the relays 135 and 141, whereby the relay 135 energizes the coil 137 of the double-acting magnet 80 (Fig. 7) and the relay 141 energizes the relays 247, 251 and 253 in that order through the contacts of the relays 244, 248 and 252, respectively. These relays set up a circuit for the holding coil 103 and a circuit for the operating coil of the relay 258. The energization of the coil 137 rotates its selecting bar 86 so as to position its resilient fingers opposite each pair of normally open contacts of the first row of contacts, of which the first pair are numbered 230 and 231.

When the push button 64 is released, it energizes the relays 115 and 154. The relay 154, when energized closes its normally open contacts, one of which connects the holding coil 103 across the busses in series with the reset button 74 and the closed contact of the relay 253. The holding bar actuated by the coil 103, engages the resilient finger adjacent to the fourth pair of contacts of the first vertical row of contacts and closes the contacts. The energization of the coil 103 also closes its normally open contact which is connected to maintain the coil 103 across the busses and holds the fourth pair of contacts closed when the time delay mechanism of the relay 117 releases its contact and deenergizes the relays 135, 141, 247, 251 and 253.

The coil of the relay 254 is energized when the coil 103 closes its normally open contact, but the time delay in closing mechanism of the relay 254 prevents it from closing before the relay 117 drops open and deenergizes the relays 135, 141, 247, 251 and 253. Thus, the slow closing relay 254 prevents the energization of the relay 258 and the subsequent energization of the coil 104 upon the energization of the relay 154. Therefore, when the push button 64 is actuated only the holding coil 103 is energized. After the relay 253 is deenergized, the relay 254 closes and is maintained across the busses 110 and 111 by the normally open contact of the coil 103. In this position, the relay 254 sets up a circuit for the relay 258 to be used when one of the push buttons subsequently is operated.

The operation of the push button 64, when the fifth tub is placed on the conveyor 28, will effect the operation of the same control relays as those described for the first operation of the push button 64 but these relays will energize the coils 137 and 104 of the coordinate switch mechanism and close the fifth pair of normally open contacts of the first vertical row of contacts (Fig. 8). The relays 141 and 154 energize the holding coil 104 because the previous operation of the holding coils 101 to 104, inclusive, the relays 244, 248, 252 and 254, and relays 247, 251 and 253 set up circuits for the operating coils 104 and 258 which are completed upon the closure of the relay 154.

The operation of the push button 67 when the sixth tub is placed on the conveyor 28, energizes the relay 129, which in turn, energizes the relays 151, 141, 247, 251, 253, 258 and 261, and the coil 208 of the double-acting magnet 81 in the manner described above for the previous operation of the push button 67. When the push button 67 is released the holding coil 105 of the coordinate switch mechanism is energized and closes the sixth pair of contacts in the fourth vertical row of contacts.

The operation of the push buttons 64 to 67, inclusive, in the order described, takes place within an interval of time which is insufficient for the conveyor system to deliver a tub to its preselected destination before the selection of the destination of the next succeeding tub is made by the dispatcher. As a result, the preselected destinations of the tubs are registered in the coordinate switching mechanism 79 in the order in which the buttons were operated so that when the hoist 35 delivers each tub to the power conveyor 38, the conveyor will carry the tubs to their preselected destinations.

It has been shown that the relays 117, 115 and 135 are energized by the operation of the push button 64; that the relays 121, 144 and 157 are energized by the operation of the push button 65; that relays 126, 147 and 161 are energized by the operation of the push button 66, and that the relays 129, 151 and 163 are energized by the operation of the push button 67. Each of the relays 117, 121, 126 and 129 are provided with three normally closed contacts which are electrically connected in the circuits for the coils of the relays 115, 157, 161 and 163 so that when any related pairs of these relays are operated, such as relays 117 and 115, the relay 117 opens its normally closed contacts and renders the relays 157, 161 and 163 inoperative by their respective push buttons.

When the relay 261 (Fig. 8) is energized with the last mentioned operation of the push button 67, one of its closed contacts connects the coil 263 of the relay 243 (Fig. 9) across the busses. Energization of the coil 263 opens the normally closed contact 242, which in turn deenergizes the holding coils 100, 101 and 102. This allows the contacts held closed by their respective holding bars to drop open whereby the holding coils may be used again to set up circuits in the coordinate switch mechanism for subsequent tubs placed on the conveyor 28. For the representative circuit shown in Figs. 8 and 9, the first three tubs placed on the conveyor must be delivered to their selected destination before the push button 67 is operated to select the destination of the sixth tub placed on the conveyor 28. However, by using one or more crossbar switch mechanisms like that shown in Fig. 3, it is possible to continue to dispatch tubs on the conveyor 28 even though the first tub has not been delivered to its preselected destination, because each crossbar mechanism is designed to register and hold ten circuits at a time.

It should be noted that the contact 242 is held open until the relay 141 drops open and deenergizes the relay 261. This arrangement prevents the holding coil 100 from being reenergized immediately after the coil 105 is energized because the contact 241 of the relay 141 must open before the contact 242 of the relay 243 can reclose. As a result, this arrangement permits only the holding coil 105 to be energized when all the preceding holding coils are energized, in the same manner that the time delay in closing relays 244, 250, 252, 254 and 260 permit only one of the coils 100 to 104 inclusive, to be energized for each operation of the push buttons 64 to 67, inclusive.

Having described the operation of the control circuits and apparatus in response to the operation of the push buttons in the selected order, it will now be shown how the hoist 35, the relays 265 to 270, inclusive, and 272 to 277, inclusive (Fig. 10), and the distributing conveyor 38 cooperate to deliver the tubs to their preselected destinations.

When the tub associated with the operation of the push button 65 reaches the conveyor 32, the hoist 35 is resting at the bottom of the shaft 34 and is holding the normally open contact of the limit switch 282 (Fig. 10) closed. In this position the switch 282 connects the operating coil of the relay 265 across the busses 110 and 111 in series with the normally closed contacts of the relays 265 to 270, inclusive, and the normally closed contact 281 of the relay 257. When the hoist is at the bottom of the shaft it also energizes the conveyor 32, whereby the conveyor 32 drives the tub on the hoist 35, which immediately carries it to the floor 26 and delivers it to the gravity conveyor 36. When the hoist leaves the bottom of the shaft, the limit switch 282 closes its normally closed contact and connects the operating coil of the relay 272 across the busses 110 and 111 in series with the normally closed contacts on the relays 272 to 276, inclusive, the previously closed contact of the relay 265 and the normally closed contact 281 of the relay 257. Thus, this trip of the hoist 35 energizes the relays 265 and 272 which close their respective normally open contacts shown in Fig. 10 and contacts 328 and 292, respectively, shown in Fig. 8, and also maintain themselves across the busses.

As the tub, which was dispatched with the operation of the push button 65, travels along the gravity conveyor 36 it closes the limit switch 312, (Figs. 1 and 9) whereupon the operating coil 290 of the relay 285 is connected across the busses 110 and 111 in series with the contacts 292 and 293, the contact 232 associated with the magnet coil 177, the bus 294 and the limit switch 312. The energization of the coil 290 closes a normally open contact 340 which connects the operating coil 341 of the relay 342 directly across the busses 335 and 336 in series with the normally closed contact 343 provided on the relay 344, and a normally closed limit switch 345 associated with the operation of the switch section 48. Energization of the relay 342 energizes the coil 351 of a contactor 352, which in turn, connects the motor 353 which drives the switch 48 across the power supply 354. The motor opens the switch section toward the spur conveyor 41, and when the switch section is aligned with the spur conveyor 41 it opens the limit switch 345 which deenergizes the relay 342 and the relay 352, whereupon the motor is disconnected from the power supply. The tub travels down the power conveyor 38 through the switch section 48 to the spur conveyor 41 which delivers it to a position adjacent to the mixing machine 22.

As the tub passes a predetermined point on the spur conveyor 41, it closes the limit switch 350. When the switch section 48 was moved from its straight line position by the motor, it allowed the limit switch 348 to assume its normally closed position, in which case, when the tub closes the switch 350, it connects the operating coil 347 of the relay 344 across the busses 335 and 336. Energization of the relay 344 energizes the relay 352 which again connects the motor 353 to the power supply 354. This subsequent energization of the motor 353 is arranged to return the switch section 48 to its straight line position with respect to the power conveyor 38. When the switch section 48 reaches its straight line position, it opens the limit switch 348 and thereby deenergizes the relays 344 and 352 and disconnects the motor 353 from the power supply.

While the tub 30 associated with the operation of the push button 65, is travelling to its destination via the conveyor 38 and the switch section 48, the hoist returns to the floor 20 to pick up the second tub dispatched on the conveyor 28 with the operation of the push button 67, which tub now is resting on the conveyor 32. When the hoist reaches the bottom of the shaft, it actuates the limit switch 282 to connect the operating coil of the relay 266 across the busses 110 and 111 in the manner described for the operation of the relay 265. The conveyor 32 drives the tub on the hoist and the hoist carries it to the conveyor 36 on the floor 26. As the hoist leaves the floor 20, the limit switch recloses and connects the operating coil of the relay 273 across the busses in the manner described for the relay 272.

Referring back to the operation of the push button 67 by the dispatcher, it is noted that its operation energized the operating coil 206 of the double-acting magnet 81 and the holding coil 101 of the coordinate switch mechanism. The operation of these coils closed the second pair of normally open contacts of the fourth vertical row of contacts associated with the magnet coil 206. Therefore, when the batch material tub associated with the operation of the push button 67 leaves the hoist 35 and closes the limit switch 312 positioned adjacent to the conveyor 36, the switch 312 connects the operating coil 309 of the relay 287 across the busses 110 and 111 in series with the intermediate bus 311, one of the normally open contacts of the second pair of contacts associated with the relay 206, the previously closed contact 295 of the relay 273, and the normally closed contact 296 provided on the relay 267.

The energization of the relay 266 closes its contact 329 which bridges the reset push button 72, whereby the destination of the second tub associated with the operation of the push button 67 can not be changed after the hoist actuates the switch 282 to energize the relay 266. When the operating coil 309 of the relay 287 is connected across the busses, it closes its normally open contact 364 which connects the operating coil of the relay 366 (Fig. 10) directly across the busses 335 and 336 of the motor control circuit. While this material tub is moving toward the power conveyor 38, the operation of the switch 312 by the tub energized the relay 366, which in turn, energizes the relay 368 and connects the motor 365 to the power supply 354. The motor 365 turns the switch 50 into alignment with the spur conveyor 45. When the switch 50 is aligned with the spur conveyor 45 it opens the normally closed switch 370 and deenergizes the relays 366 and 368 whereupon the motor 365 is disconnected from the power supply.

The second tub 30 positioned on the conveyor 28 and associated with the operation of the button 67 passes through the switch 50 to the spur conveyor 45 which carries it to the mixing machine 24. As the tub travels along the conveyor 45 it closes the limit switch 372. When the switch 50 was moved from its straight line position with respect to the conveyor 38, it allowed the switch 371 to assume its normally closed position. Thus, when the tub closes the switch 372, the operating coil of the relay 367 is connected across the busses 335 and 336. This energizes the operating coil of the relay 367 and closes its normally open contacts, one of which energizes the relay 368 which connects the motor 365 to the power supply. The motor 365 moves the switch 50 back into its straight line position with respect to the conveyor 38, and when the switch is aligned with the conveyor 38 it opens the switch 371 which deenergizes the relays 367 and 368. This causes the motor 365 to be disconnected from the power supply and the switch remains in this position until the motor 365 is actuated to direct another tub to the mixing machine 24.

The hoist 35 returns to the floor 20, whereupon the power conveyor 32 delivers the third tub which was positioned on the conveyor 28 with the operation of the push button 66 on the hoist 35. The hoist closes the normally open contact of the limit switch 282, which in turn, energizes the relay 267. The hoist carries the tub to the floor 20 and delivers it to the gravity conveyor 36. As the hoist leaves the floor 20, the limit switch recloses its normally closed contact and energizes the relay 274. Energization of the relays 267 and 274 closes the normally open contacts 330 and 297, respectively. When the third tub 30 closes the limit switch 312, it thereby connects the operating coil of the relay 286 across the busses 110 and 111 in series with one of the normally open contacts of the third pair of normally open contacts associated with the operating coil 193 and held closed by the holding coil 102, the previously closed contact 297 and the normally closed contact 298 of the relays 274 and 268, respectively.

The closure of the switch 312 by the third tub causes the motor 355 to operate the switch 49 so that it is aligned with the spur conveyor 44. The third tub passes to the conveyor 44 which carries it to the mixing machine 23. The tub actuates the limit switches associated with the spur conveyor 44 which causes the motor to return the switch 49 in line with the power conveyor 38 in the manner described for the operation of the switch sections 48 and 50.

It should be noted here that the holding coils 100, 101 and 102, which control the destination of the first three tubs dispatched by the dispatcher at the control panel 60 maintain themselves across the busses 110 and 111 in series with the normally closed contact 242 on the relay 243 after the tubs have been delivered by the conveyor 38 to their preselected destinations. However, some time after the third tub is delivered to the mixing machine 23, the push button 67 is actuated and releases the holding coils 100, 101 and 102, in the manner described.

It has been shown that the fourth tub was dispatched with the operation of the push button 64 which sets up a circuit in the coordinate switch mechanism which includes the fourth pair of normally open contacts of the first vertical row of contacts associated with the coil 137 of the double-acting magnet 80. However, when the fourth tub closes the switch 312, none of the switch motors 353, 355 and 365 are energized because the normally open contact associated with the coil 137 is open circuited. This arrangement prevails because tubs for the first mixing machine 21 do not have to be switched from the conveyor 38 to the spur conveyor 40 since the mixing machine 21 is located at the end of the conveyor 38. Thus, the fourth material tub dispatched by the dispatcher proceeds directly to the mixing machine 21. Likewise, the fifth tub dispatched by the dispatcher with the second operation of the push button 64, is conveyed directly to the mixing machine 21.

The sixth tub was dispatched on the conveyor 28 with the operation of the push button 67. It has been shown that the operation of the push button 67, in selecting the destination of the sixth tub, energized the magnet 206 which sets its resilient fingers adjacent to the contacts of the fourth vertical row of normally open contacts (Fig. 8), and that the subsequent energization of the holding coil 105 operated its clamping bar to close the sixth pair of contacts in this row. When the hoist leaves the floor 20 with the sixth tub, the switch 282 returns to its normally closed position and connects the operating coil of the relay 77 across the busses in series with the previously closed contact of the relay 270. The operation of the relay 277 closes its normally open contact 306 and connects the operating coil of the relay 287 across the busses 110 and 294. When the sixth tub closes the switch 312, the bus 294 is connected to the bus 111, whereby the relay 287 is connected directly across the busses 110 and 111 in series with one of the closed contacts in the fourth vertical row of contacts associated with the coil 206.

The energization of the relay 287 connects the motor 365 across the power supply 354 in the manner described and moves the switch 50 in line with the spur conveyor 45. The sixth tub passes from the conveyor 38 through the switch 50 to the conveyor 45 which carries it to the mixing machine 24. When the tub closes the limit switch 372 positioned adjacent to the conveyor 45, the motor 365 is energized to return the switch section 50 in line position with the conveyor 38 in the manner described for the previous operation of the switch 50 when the second tub actuated the limit switch 372. Thus, the sequence of operation of the relays 265 to 270, inclusive, and 272 to 277, inclusive, is arranged to prevent a subsequent energization of the relays 285, 286 and 287 through the contacts held closed by the magnet coils 100 and 105, after the tubs have been delivered to the power conveyor 38 by the hoist.

It should be noted that the holding coils 100 to 102, inclusive, maintain themselves across the busses 110 and 111 and hold the contacts of the coordinate switch closed after the tubs associated with the operation of these coils are delivered to their preselected destinations. However, the above-described sequential operation of the relays 266 to 270, inclusive, open their respective normally closed contacts 293, 296, 298, 301 and 305 in the order named and interrupt each previously used circuit controlling the operation of the relays 285, 286 and 287, and, thereby prevent the operation of the incorrect switch of the conveyor 38 by the closed contacts maintained in the coordinate switch mechanism by the holding coils. The relay 265 (Fig. 7) does not have a normally closed contact provided in the circuits with the relays 285 to 287, inclusive, due to the fact that no switching mechanism is needed for the delivery of tubs to the mixing machine 21.

The indicating lamps in the lamp bank 70 are provided for indicating the sequence of operation of the push buttons 64 to 67, inclusive, and serve as a means of indicating when the particular tubs associated with the lighted lamps have been picked up by the hoist 35 for delivery to the power conveyor 38. When the push button 65 is actuated as described hereinabove, it energizes the operating coil 177 of the double-acting magnet 80 and sets the resilient fingers associated with its selecting bar so that the subsequent operation of the magnet coil 100 closes the normally open contacts 232 and 233 of the second vertical row of contacts. The closure of the contact 233 connects the first indicating lamp of the second vertical row of lamps of the bank 70 across the busses 110 and 111 in series with the normally closed contact 320 (Fig. 8) of the relay 265. The actuation of the push button 67 energizes the operating coil 206 (Fig. 6) of the double-acting magnet 81, the holding coil 101 (Fig. 7) and closes the second pair of normally open contacts of the fourth vertical row of contacts. One of these contacts connects the second lamp of the fourth vertical row of lamps in the bank 70 directly across the busses 110 and 111 in series with the normally closed contact 321 on the relay 267 (Figs. 7 and 9). The actuation of the push buttons 66, 64, 64 and 67 in the named order energizes the third lamp in the second vertical row, the fourth and fifth lamps in the first vertical row and the sixth lamp in the third vertical row of lamps in the lamp bank 70 in the same manner as that described for the energization of the lamps in the first and second rows of the lamp bank.

The lamps remain lighted after the push buttons have been actuated until the hoist 35 actuates the limit switch 282 as it returns to the floor 20 after each trip to the floor 26.

For example, when the tub associated with the operation of the push button 65 is picked up by the hoist, the relay 265 is energized and opens its normally closed contact 320 and thereby disconnects the first lamp in the second vertical row of lamps from the busses. This operation is repeated for each operation of the hoist with respect to the lamps which were lighted according to the sequence of operation of the push buttons. Thus, the sequence operation of the push buttons 64 to 67, inclusive, is indicated by the lamps in the lamp bank 70 only so long as the preselected destinations of the tub can be cancelled by the dispatcher at the control panel 60.

It has been shown hereinabove that when the hoist receives a particular tub and leaves the floor 20, the destination of that particular tub can not be cancelled by the operation of the reset push button associated with the preseleceted destination of the tub because the normally open contacts 328 to 333, inclusive, provided on the relays 265 to 270, inclusive, bridge the reset button as the relays are energized by the operation of the switch 282 by the hoist to energize the relays. For example, the normally open contact 328 (Fig. 7) bridges the push button 71, the normally open contact 329 bridges the push button 72, and the normally open contact 330 bridges the push button 73 and so forth as the relays 265 to 270, inclusive, are energized.

It is believed to be apparent from the description of the operation of the sequence selecting relays 265 to 270, inclusive, and 272 to 277, inclusive, that the destination of the batch material tubs 30—30 may be changed by the dispatcher at the control panel 60 at any time before the hoist returns for the particular tub whose destination is to be changed. After the hoist picks up the particular tub in question, its destination is fixed by the operation of one of the sequence selector relays 272 to 277, inclusive, associated with the operation of the particular trip of the hoist, and, at the same time the lamps associated with the selection of the destination of the particular tub is deenergized showing that it has reached a point in its delivery where its selection can not be altered since the associated control circuit has been set up to carry it to its preselected destination.

It should be noted that the operation of the button 67 when the sixth tub was placed on the conveyor 28, picked up the relays 141, 247, 251, 253, 258 and 261 (Fig. 7) in the order named so as to set up a circuit for the coil 263 of the relay 243. The subsequent energization of the magnet coil 105, when the button is released, connects the operating coil 263 of the relay 243 directly across the busses 110 and 111 in series with the normally open contact associated with the coil 105 and the normally open contact of the relay 261. Energization of the coil 263 opens the normally closed contact 242, in which case, the holding coils 100 to 102, inclusive, are disconnected from the busses 110 and 111 whereupon the coils allow their holding bars to return to their normal positions. As a result, the contacts held in their closed position by these coils return to their normally open positions. Consequently, there are only three circuits remaining in the coordinate switching system to be carried out as the first three circuits have been cleared so that the destination of subsequent tubs positioned on the conveyor 28 may be stored by the holding magnets 100 to 102, inclusive.

When the hoist picks up the sixth tub and carries it to the floor 26, the limit switch 282 recloses and connects the coil of the relay 277 across the busses 110 and 111 in series with contacts on the relays 270 and 257. The energization of the relay 277 connects the operating coil 283 of the relay 257 directly across the busses 110 and 111 in series with the closed contact of the relay 277 and the normally open contact of the switch 282. Therefore, when the hoist returns to the floor 20 after delivering the sixth tub to the floor 26 and actuates the switch 282, the operating coil 283 of the relay 257 is energized and opens the normally closed contacts 256 and 281. The opening of the contact 256 disconnects the operating coils 103 to 105, inclusive, from the busses whereupon their holding bars release the contacts associated with the double-acting magnets 80 and 81. This operation of the relay 257 clears the remaining circuits of the coordinate switch mechanism so that they may be used again to store up circuits as subsequent batch material tubs are placed on the conveyor 28. Thus, each time the relays 243 and 257 are energized, the above-described portions of the coordinate switch mechanism are cleared so the respective holding coils may be used for setting up circuits for the preselected destination of subsequent material tubs as they are positioned on the conveyor 28. By virtue of this arrangement, when the maximum number of circuits have been stored up in the coordinate switching system, the apparatus operates to clear the first portion so that it may be reused while the remaining portion carries out the preselected control circuits for the tubs associated with the operation of that particular portion. Likewise, the opening of the contact 281 deenergizes the coils of the relays 265 to 270, inclusive, and 272 to 277, inclusive, whereupon these relays drop open.

Let it be assumed that the material tubs 30—30 have been placed on the conveyor 28 in the order named and discussed hereinabove. As the conveyor system operates to deliver the material tubs to their preselected destination, it may happen that one of the mixing machines 21 to 24, inclusive, has changed the picture originally presented by the indicating lamps 61—61 on the panel 60 at the time the tub was placed on the conveyor 28. When such a condition arises the dispatcher may wish to cancel a preselected destination of a material tub and reroute it to another mixing machine that appears in immediate need for material of the type in one of the tubs already dispatched to another destination.

Let it be assumed that the preselected destination of the sixth tube to the mixing machine 24 by the second operation of the push button 67 is to be cancelled so that the tub can be rerouted to the mixing machine 22. Since the sixth tub, which was placed on the conveyor 28 with the operation of the push button 67, is waiting on the conveyor 31 for the hoist 35, the dispatcher can cancel its preselected destination by pressing the button 76 provided on the panel 60. Referring to the coordinate switching system shown in Figs. 7 to 10, inclusive, it is noted that the operation of the push button 76 disconnects the holding coil 105 from the busses 110 and 111, in which case, the coil is deenergized and opens its closed contact and releases the holding bar 99 so that the sixth pair of contacts of the fourth vertical row of contacts may return to their normally open position. This operation of the button 76 also deenergizes the particular lamp of the lamp bank 71, which was lighted when the push button 67 was actuated. To send the tub which was previously destined for the mixing machine 24 to the mixing machine 22, the push button 65 now is actuated. The operation of the push button 65, energizes the relays 121, 157, 144, 141 and 154 in the manner described for the previous operation for the push button 65. These relays set up the associated circuits provided in the coordinate switch mechanism so that the operating coil 177 of the double magnet 80 is energized and rotates its selecting bar so as to position its selecting fingers adjacent to the normally open contacts of the second vertical row of contacts. The energization of these relays also energizes the holding coil 105 which operates its respective holding bar 99 so as to close the sixth pair of normally open contacts associated with the operating coil 177. By this operation of the push button 65 we now have the sixth tub that was placed on the conveyor 28 arranged to be delivered to the mixing machine 22 in the manner described for the initial operation of the push button 65.

What is claimed is:

1. An endless conveyor for delivering containers having various materials therein to a plurality of mixing machines, which comprises a level conveyor positioned adjacent to supplies of materials to be deposited in the containers and delivered thereby to the mixing machines, a driven conveyor positioned at a different level with respect to the level conveyor for distributing the filled containers to the mixing machines, a plurality of spur conveyors, one for each processing station, for conveying the filled containers from the distributing conveyor to the mixing machines, an electrically controlled hoist arranged to automatically deliver one filled container at a time from the level conveyor to the distributing conveyor, switching means, one for each spur conveyor for directing the filled containers from the distributing conveyor to the mixing machines, a second electrically operated hoist for returning empty containers from the mixing machines to the beginning end of the level conveyor, a gravity conveyor for conveying empty containers from the mixing machines to the last-mentioned hoist, a plurality of dispatch buttons, one for each mixing machine, said buttons being grouped at the beginning end of the level conveyor so that the destination of containers may be selected as they enter the level conveyor, an electrical switching mechanism operable under control of said dispatch buttons to register the sequence of operation of the buttons associated with the positioning of the containers on the level conveyor, means selectively controlled by the electrical switching mechanism for actuating the conveyor switching means, and means operable by the first-mentioned hoist for causing the electrical switching mechanism to operate the conveyor switching means in the same sequence that the dispatch buttons are operated, whereby the driven conveyor delivers the containers to the mixing machines in the same sequence that dispatch buttons are operated.

2. An endless conveyor for delivering containers having various materials therein to a plurality of material mixing machines, which comprises a level conveyor positioned adjacent to supplies of materials to be delivered in the containers to the mixing machines, a driven conveyor positioned at a different level with respect to the level conveyor for distributing the filled conveyors to the mixing machines, a plurality of spur conveyors, one for each mixing machine, for conveying the filled containers from the distributing conveyor to the mixing machines, an electrically controlled hoist arranged to automatically deliver one filled container at a time from the end of the level conveyor to the beginning end of the distributing conveyor, switching means, one for each spur conveyor, for directing the filled containers from the driven conveyor to the mixing machine, a second electrically operated hoist for returning empty containers from the mixing machines to the level conveyor, a gravity conveyor for conveying empty containers from the mixing machines to the last-mentioned hoist, a plurality of dispatch buttons, one for each mixing machine, said buttons being grouped at the beginning end of the loading conveyor so that the destination of containers may be selected when they enter the level conveyor, an electrical switching mechanism operable under control of said dispatch buttons to register the sequence of operation of the buttons associated with the containers entering the loading conveyor, means arranged to be energized when the maximum number of registrations are contained in the switching mechanism for removing some of the previous registrations after the containers associated therewith have reached their preselected mixing machine, means for removing the remaining registrations contained in the switching mechanism when the first-mentioned hoist carries the container associated with the maximum registration to the distributing conveyor, timing means electrically connected to the switching mechanism so as to cause only one registration to be effected therein upon the operation of any one of the dispatch buttons, means selectively controlled by the switching mechanism for actuating the conveyor switching means, and means operable under control of the first-mentioned hoist in a predetermined cyclic order for causing the switching mechanism to operate the conveyor switching means in the same sequence that the dispatch buttons are operated, whereby the driven conveyor delivers the containers to the mixing machines in the same sequence that the dispatch buttons are operated.

3. A conveyor for selectively delivering articles to a plurality of processing stations, which comprises a main conveyor having one end thereof adjacent to the processing stations, a plurality of spur conveyors, one for each processing station, means for switching articles from the main conveyor to the spur conveyors, a plurality of dispatch means, one for each processing station, said dispatch means being grouped at a point on the conveyor remote from the processing stations for selecting the station designation of each article as it enters the other end of the main conveyor, an electrical switching mechanism operable under control of the dispatch means to register the sequence of operation of said dispatch means in selecting the station designation of the articles, means controlled by the switching mechanism for controlling the operation of the switching means so as to deliver the articles from the main conveyor to their preselected processing stations in the same sequence as the dispatch means are operated, a plurality of manually operable contacts, one contact associated with each of the dispatched articles for selectively cancelling any one of the previous registrations maintained in the switching mechanism in order that its associated article may be rerouted to a different processing station, and means positioned intermediate of the entrance end of the conveyor and the switching means and arranged to be actuated when an article reaches a point on the conveyor adjacent thereto to prevent the subsequent cancellation of the destination of said article.

4. A conveyor for selectively delivering articles to a plurality of processing stations, which comprises a main conveyor having one end thereof adjacent to the processing stations, a plurality of spur conveyors, one for each processing station, means for switching articles from the main conveyor to the spur conveyors, a plurality of manually operable dispatch buttons, one for each processing station, said dispatch buttons being grouped at a point on the conveyor remote from the processing stations for selecting the station designation of each article as it enters the other end of the main conveyor, an electrical switching mechanism operable under control of the dispatch buttons to register the sequence of operation of the buttons in selecting the station designation of the articles, means controlled by the switching mechanism for controlling the operation of the switching means so as to deliver the articles from the main conveyor to their preselected processing stations in the same sequence as the dispatch buttons are operated, a plurality of manually operable, normally closed contacts, one contact associated with each of the dispatched articles for selectively cancelling any one of the previous registrations maintained in the switching mechanism in order that its associated article may be rerouted to a different processing station, and means positioned intermediate of the entrance end of the conveyor and the switching means and arranged to be actuated when an article reaches a point on the conveyor adjacent thereto to bridge the contact associated therewith and thereby prevent subsequent cancellation of the destination of said article.

5. A conveyor for selectively delivering containers having materials therein to a plurality of processing stations, which comprises a level conveyor positioned adjacent to a supply of materials, a second conveyor positioned at a different level with respect to the level conveyor, a plurality of spur conveyors, one for each processing station for conveying material-filled containers from the second conveyor to the processing stations, switching means, one for each spur conveyor for directing the material-filled containers from the second conveyor to said spur conveyor, an electrically controlled hoist arranged to automatically deliver one material-filled container at a time from the level conveyor to the second conveyor, a second electrically operated hoist for returning empty containers from the processing stations to the beginning end of the level conveyor, a plurality of dispatch means, one for each processing station, said dispatch means being arranged for selecting the destination of material-filled containers as they enter the level conveyor, an electrical switching mechanism operable under the control of said dispatch means to register the sequence of operation thereof in selecting the station designation of the containers, means controlled by the switching mechanism for controlling the operation of the switching means so as to deliver the containers from the second conveyor to their preselected processing stations in the same sequence as the dispatch means are operated.

6. A conveyor for selectively delivering containers having materials therein to a plurality of processing stations, which comprises a level conveyor positioned adjacent to a supply of materials, a second conveyor positioned at a different level with respect to the level conveyor, a plurality of spur conveyors, one for each processing station for conveying material-filled containers from the second conveyor to the processing stations, switching means, one for each spur conveyor for directing the material-filled containers from the second conveyor to said spur conveyor, an electrically controlled hoist arranged to automatically deliver one material-filled container at a time from the level conveyor to the second conveyor, a second electrically operated hoist for returning empty containers from the processing stations to the beginning end of the level conveyor, a plurality of dispatch buttons, one for each processing station, said buttons being arranged for selecting the destination of material-filled containers as they enter the level conveyor, an electrical switching mechanism operable under the control of said dispatch buttons to register the sequence of operation of the buttons in selecting the station designation of the containers, means controlled by the switching mechanism for controlling the operation of the switching means so as to deliver the containers from the second conveyor to their preselected processing stations in the same sequence as the dispatch buttons are operated, and means for selectively cancelling any one of the previous registrations maintained in the switching mechanism before its associated container reaches a predetermined point on the level conveyor in order that said associated container may be rerouted to a different processing station.

References Cited in the file of this patent

UNITED STATES PATENTS

| Number | Name | Date |
| --- | --- | --- |
| 1,324,247 | Gehring | Dec. 9, 1919 |
| 1,528,227 | Spooner | Mar. 3, 1925 |
| 2,021,329 | Reynolds | Nov. 19, 1935 |
| 2,216,610 | Culbertson | Oct. 1, 1940 |
| 2,307,712 | Schenk | Jan. 5, 1943 |
| 2,310,160 | Cohen | Feb. 2, 1943 |
| 2,342,652 | Eakins | Feb. 29, 1944 |
| 2,362,079 | McCann | Nov. 7, 1944 |
| 2,371,491 | Wright | Mar. 13, 1945 |
| 2,395,428 | Potts | Feb. 26, 1946 |
| 2,490,071 | Mackechnie | Dec. 6, 1949 |
| 2,497,149 | Berdis | Feb. 14, 1950 |